United States Patent
Jimbo

(10) Patent No.: US 10,291,791 B2
(45) Date of Patent: May 14, 2019

(54) ELECTRONIC DEVICE, INFORMATION DISTRIBUTION SYSTEM, INFORMATION PROCESSING METHOD, AND RECORDING MEDIUM

(71) Applicant: Junya Jimbo, Tokyo (JP)

(72) Inventor: Junya Jimbo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/836,985

(22) Filed: Dec. 11, 2017

(65) Prior Publication Data

US 2018/0167520 A1    Jun. 14, 2018

(30) Foreign Application Priority Data

Dec. 13, 2016    (JP) ................................. 2016-241651

(51) Int. Cl.
*H04N 1/00* (2006.01)
*G06F 3/12* (2006.01)
(Continued)

(52) U.S. Cl.
CPC ......... *H04N 1/00061* (2013.01); *G06F 3/121* (2013.01); *G06F 3/1203* (2013.01); *G06F 3/1235* (2013.01); *G06F 3/1288* (2013.01); *G06F 3/1293* (2013.01); *G06Q 10/087* (2013.01); *G06Q 10/20* (2013.01);
(Continued)

(58) Field of Classification Search
CPC ........... H04N 1/00061; H04N 1/00413; H04N 1/00477; H04N 1/00023; H04N 1/00042; H04N 1/00079; H04N 1/00092; H04N 2201/0094; G06F 3/1293; G06F 3/1203;
(Continued)

(56) References Cited

U.S. PATENT DOCUMENTS

| 5,325,156 A | 6/1994 | Ulinski |
| 5,594,529 A | 1/1997 | Yamashita et al. |

(Continued)

FOREIGN PATENT DOCUMENTS

| EP | 0 599 523 A2 | 6/1994 |
| EP | 0 715 221 A1 | 6/1996 |

(Continued)

OTHER PUBLICATIONS

Extended European Search Report dated Feb. 26, 2018 in European Patent Application No. 17206150.9, citing documents AA, AB, AO and AP therein, 7 pages.

*Primary Examiner* — Allen H Nguyen
(74) *Attorney, Agent, or Firm* — Oblon, McClelland, Maier & Neustadt, L.L.P.

(57) ABSTRACT

An electronic device communicable with a server system via a network, includes circuitry to: transmit information on the electronic device to the server system; store in a memory information on a display component corresponding to the information on the electronic device that is acquired from the server system; read the information on the display component stored in the memory at a predetermined timing; display the display component that is read on a display; in response to selection of the display component, acquire information associated with the display component from the server system; and display the acquired information on the display.

13 Claims, 19 Drawing Sheets

(51) Int. Cl.
*G06Q 10/08* (2012.01)
*G06Q 10/00* (2012.01)

(52) U.S. Cl.
CPC ..... *H04N 1/00023* (2013.01); *H04N 1/00042* (2013.01); *H04N 1/00079* (2013.01); *H04N 1/00092* (2013.01); *H04N 1/00413* (2013.01); *H04N 1/00477* (2013.01); *H04N 2201/0094* (2013.01)

(58) Field of Classification Search
CPC ...... G06F 3/1288; G06F 3/121; G06F 3/1235; G06Q 10/087; G06Q 10/20
USPC ........................................................ 358/1.15
See application file for complete search history.

(56) References Cited

U.S. PATENT DOCUMENTS

| | | | |
|---|---|---|---|
| 2002/0054340 A1* | 5/2002 | Tokutomi | B41J 2/17533 358/1.15 |
| 2005/0253887 A1 | 11/2005 | Garrana et al. | |
| 2007/0188530 A1 | 8/2007 | Garrana et al. | |
| 2010/0088609 A1 | 4/2010 | Kawana | |
| 2011/0067023 A1 | 3/2011 | Chiyo et al. | |
| 2011/0125655 A1 | 5/2011 | Chiyo et al. | |
| 2011/0311243 A1* | 12/2011 | Kawai | G03G 15/5079 399/28 |
| 2012/0014701 A1* | 1/2012 | Tokuno | G03G 15/5079 399/12 |
| 2012/0328306 A1* | 12/2012 | Kaneko | G03G 15/556 399/8 |
| 2015/0058433 A1 | 2/2015 | Chiyo | |
| 2015/0215480 A1* | 7/2015 | Chiyo | H04N 1/00204 358/1.15 |
| 2015/0254735 A1 | 9/2015 | Kakii | |
| 2016/0105492 A1 | 4/2016 | Jimbo | |
| 2016/0292772 A1* | 10/2016 | Nagasaki | G06Q 30/0633 |
| 2016/0366291 A1 | 12/2016 | Jimbo | |
| 2016/0371070 A1 | 12/2016 | Jimbo | |
| 2017/0064093 A1* | 3/2017 | Shishido | H04N 1/00034 |
| 2017/0212714 A1 | 7/2017 | Watanabe et al. | |

FOREIGN PATENT DOCUMENTS

| | | |
|---|---|---|
| JP | 2014-049003 | 3/2014 |
| JP | 2014-127840 | 7/2014 |
| JP | 2015-062114 | 4/2015 |
| JP | 2015-142288 | 8/2015 |
| JP | 2015-148968 | 8/2015 |
| JP | 2015-158937 | 9/2015 |
| JP | 2015-180986 | 10/2015 |
| JP | 2016-058076 | 4/2016 |
| JP | 2016-081077 | 5/2016 |
| JP | 2016-081120 | 5/2016 |
| JP | 2016-218706 | 12/2016 |
| JP | 2017-004217 | 1/2017 |
| JP | 2017-010532 | 1/2017 |

* cited by examiner

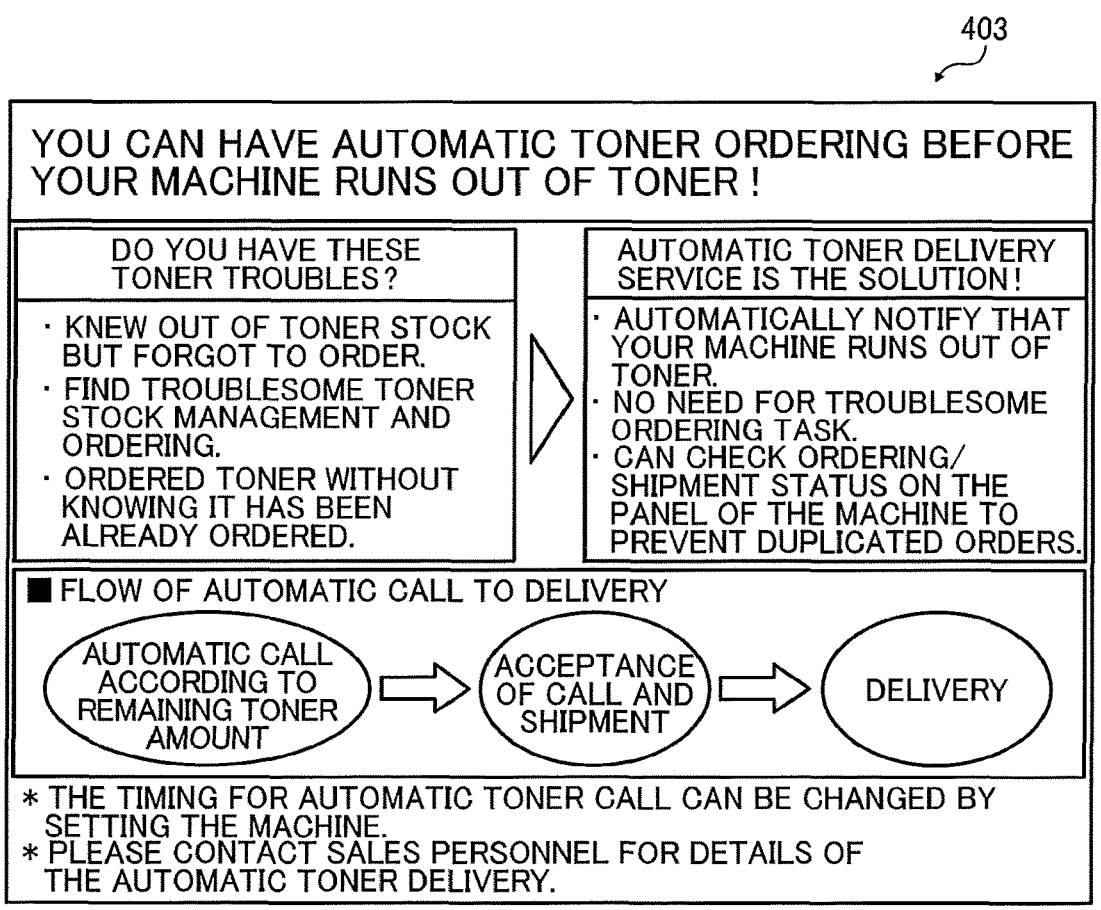

TONER DELIVERY HISTORIES  INFORMATION UPDATE TIME: SEPTEMBER 6, 2016, 13:30

DELIVERY DESTINATION: ABC COMPANY
MODEL AND MACHINE NUMBER: 3F13-110087

LATEST DELIVERY HISTORIES BY TONER

| AUTOMATIC NOTIFICATION DATE | PRODUCT NAME (BY TONER) | LATEST DELIVERY STATUS (BY TONER) |
|---|---|---|
| 2016/06/05 | P TONER BLACK C5002 | ALREADY SHIPPED (ESTIMATED TO BE DELIVERED ON JUNE 7, 2016) |
| 2016/06/05 | P TONER CYAN C5002 | ALREADY SHIPPED (ESTIMATED TO BE DELIVERED ON JUNE 7, 2016) |
| 2016/06/05 | P TONER MAGENTA C5002 | ALREADY SHIPPED AND RETURNED |
| 2016/06/05 | P TONER YELLOW C5002 | ALREADY SHIPPED (ESTIMATED TO BE DELIVERED ON JUNE 7, 2016) |

LIST OF DELIVERY HISTORIES

| AUTOMATIC NOTIFICATION DATE | PRODUCT NAME | LATEST DELIVERY STATUS |
|---|---|---|
| 2016/06/05 | P TONER BLACK C5002 | ALREADY SHIPPED (ESTIMATED TO BE DELIVERED ON JUNE 7, 2016) |
| 2016/06/05 | P TONER CYAN C5002 | ALREADY SHIPPED (ESTIMATED TO BE DELIVERED ON JUNE 7, 2016) |
| 2016/06/05 | P TONER MAGENTA C5002 | ALREADY SHIPPED AND RETURNED |
| 2016/06/05 | P TONER YELLOW C5002 | ALREADY SHIPPED (ESTIMATED TO BE DELIVERED ON JUNE 7, 2016) |

CONDITION CHECK            STOP 402 (80)

(4)

70

(5)

FIG. 12A  FIG. 12 | FIG. 12A | FIG. 12B
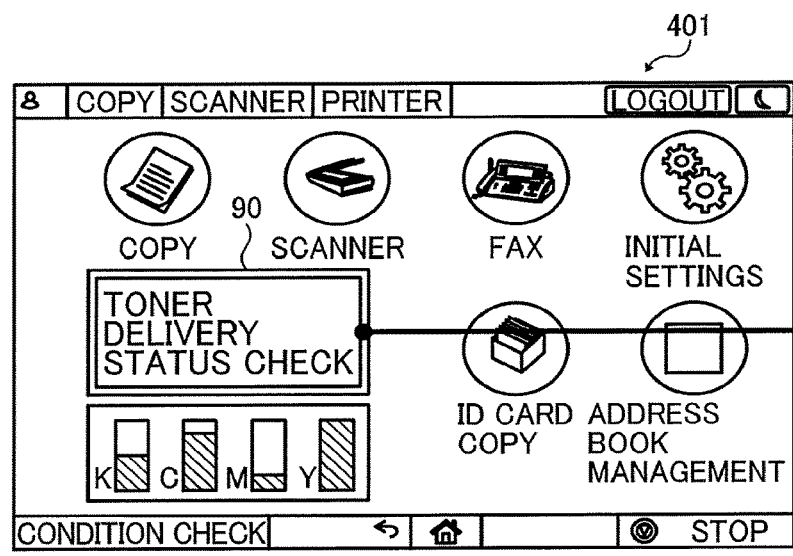

FIG. 12B

TONER DELIVERY HISTORIES — INFORMATION UPDATE TIME: SEPTEMBER 6, 2016, 13:30

DELIVERY DESTINATION: ABC COMPANY
MODEL AND MACHINE NUMBER: 3F13-110087

LATEST DELIVERY HISTORIES BY TONER

| AUTOMATIC NOTIFICATION DATE | PRODUCT NAME (BY TONER) | LATEST DELIVERY STATUS (BY TONER) |
|---|---|---|
| 2016/06/05 | P TONER BLACK C5002 | ALREADY SHIPPED (ESTIMATED TO BE DELIVERED ON JUNE 7, 2016) |
| 2016/06/05 | P TONER CYAN C5002 | ALREADY SHIPPED (ESTIMATED TO BE DELIVERED ON JUNE 7, 2016) |
| 2016/06/05 | P TONER MAGENTA C5002 | ALREADY SHIPPED AND RETURNED |
| 2016/06/05 | P TONER YELLOW C5002 | ALREADY SHIPPED (ESTIMATED TO BE DELIVERED ON JUNE 7, 2016) |

LIST OF DELIVERY HISTORIES

| AUTOMATIC NOTIFICATION DATE | PRODUCT NAME | LATEST DELIVERY STATUS |
|---|---|---|
| 2016/06/05 | P TONER BLACK C5002 | ALREADY SHIPPED (ESTIMATED TO BE DELIVERED ON JUNE 7, 2016) |
| 2016/06/05 | P TONER CYAN C5002 | ALREADY SHIPPED (ESTIMATED TO BE DELIVERED ON JUNE 7, 2016) |
| 2016/06/05 | P TONER MAGENTA C5002 | ALREADY SHIPPED AND RETURNED |
| 2016/06/05 | P TONER YELLOW C5002 | ALREADY SHIPPED (ESTIMATED TO BE DELIVERED ON JUNE 7, 2016) |

CONDITION CHECK — STOP

ELECTRONIC DEVICE, INFORMATION DISTRIBUTION SYSTEM, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2016-241651, filed on Dec. 13, 2016, in the Japan Patent Office, the entire disclosure of which is hereby incorporated by reference herein.

BACKGROUND OF THE INVENTION

Field of the Invention

The present invention relates to an electronic device, an information distribution system, an information processing method, and a recording medium.

Description of the Related Art

There is known an information distribution system that distributes information with the use of an electronic display device such as a display. The information distribution system is called digital signage and is used in various places where persons pass by or exist such as outdoors, stores, public spaces, and transportation facilities.

Recently, it has been proposed to distribute information from the information distribution system to one or more electronic devices in such as offices. JP 2015-180986 A discloses a distribution control device that acquires electric device information from electronic devices, and selects, from among one or more pieces of distribution information, the distribution information according to the acquired electronic device information.

However, the conventional information distribution systems have a disadvantage that users cannot view easily the information.

FIGS. 1A to 1C are diagrams describing a series of operations performed by a user on an electronic device to display a content using the information distribution system. FIG. 1A illustrates a home screen 401 where an image forming apparatus as an electronic device displays an icon 408 to notify that there is a displayable content. The user presses the icon 408 to display a screen illustrated in FIG. 1B. This screen includes a content menu 409 indicating contents that can be currently distributed by the information distribution system. The user selects (presses) an arbitrary item. FIG. 1C illustrates the content corresponding to the item pressed by the user.

As described above, in the conventional information distribution system, the user needs to select an item from the content menu 409 being displayed. This means that the user has to perform a number of operations to display contents desired by the user. Accordingly, the user may find these operations troublesome or have difficulty in displaying a desired content.

SUMMARY OF THE INVENTION

Example embodiments of the present invention include an electronic device communicable with a server system via a network, comprising circuitry to: transmit information on the electronic device to the server system; store in a memory information on a display component corresponding to the information on the electronic device that is acquired from the server system; read the information on the display component stored in the memory at a predetermined timing; display the display component that is read on a display; in response to selection of the display component, acquire information associated with the display component from the server system; and display the acquired information on the display.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 1A to 1C are diagrams describing a series of operations performed by a user on an electronic device to display a content using an information distribution system, according to the prior art;

FIGS. 2A to 2C are diagrams illustrating an example of content displayed by an image forming apparatus as an example of electronic device according to an embodiment;

FIGS. 12A and 12B (FIG. 12) are diagrams illustrating an example of consumables delivery status content as an example of content for administrator;

Figure 1A:
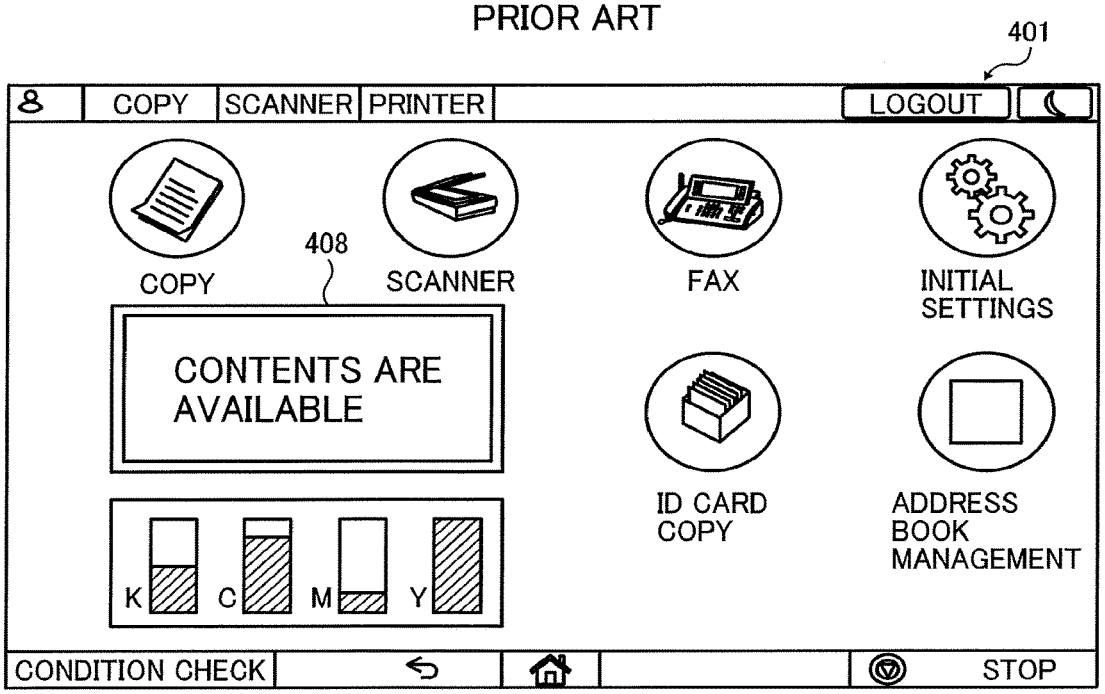
Figure 1B:
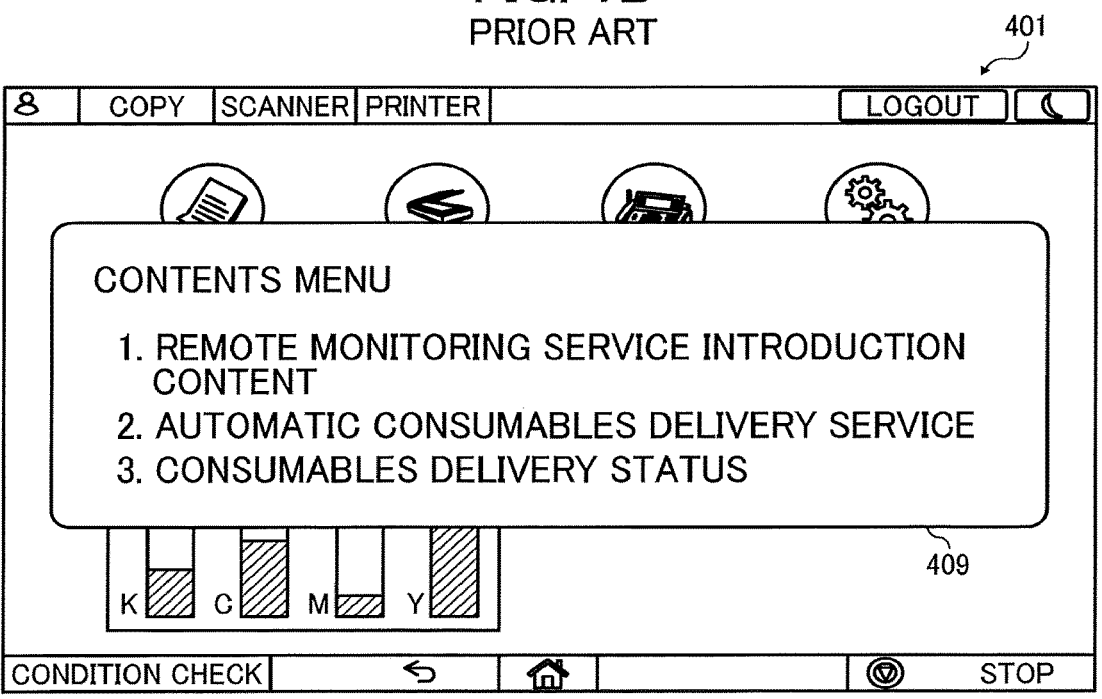

The accompanying drawings are intended to depict embodiments of the present invention and should not be interpreted to limit the scope thereof. The accompanying drawings are not to be considered as drawn to scale unless explicitly noted.

DETAILED DESCRIPTION OF THE INVENTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, an information distribution system and an information distribution method performed by the information distribution system will be described below, according to embodiments.

<Overview of Operations of an Image Forming Apparatus>

Figure 2A:
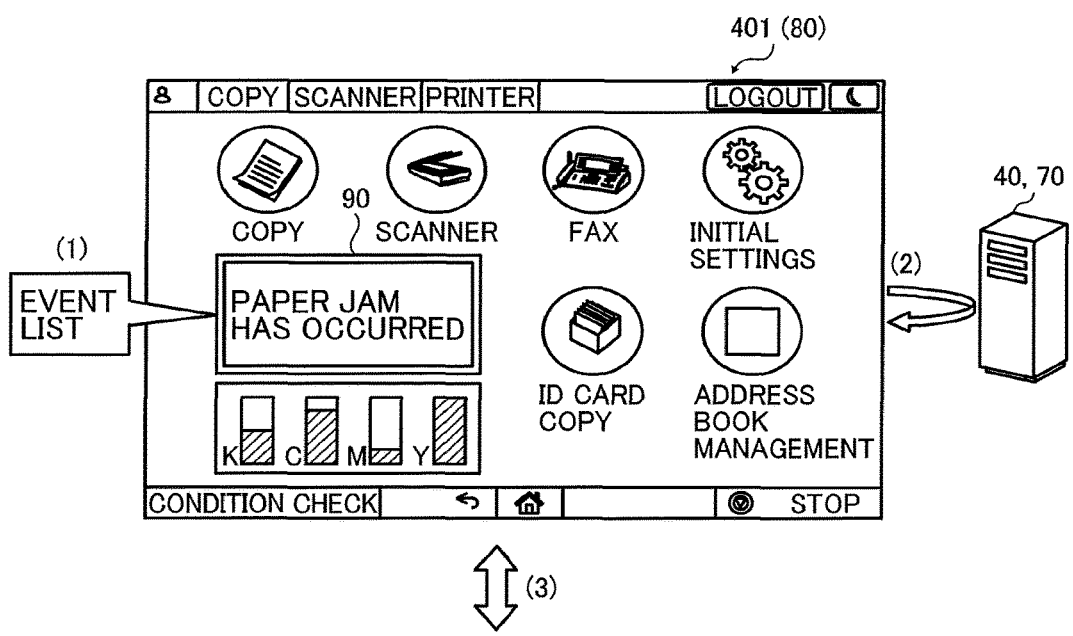
Figure 2B:
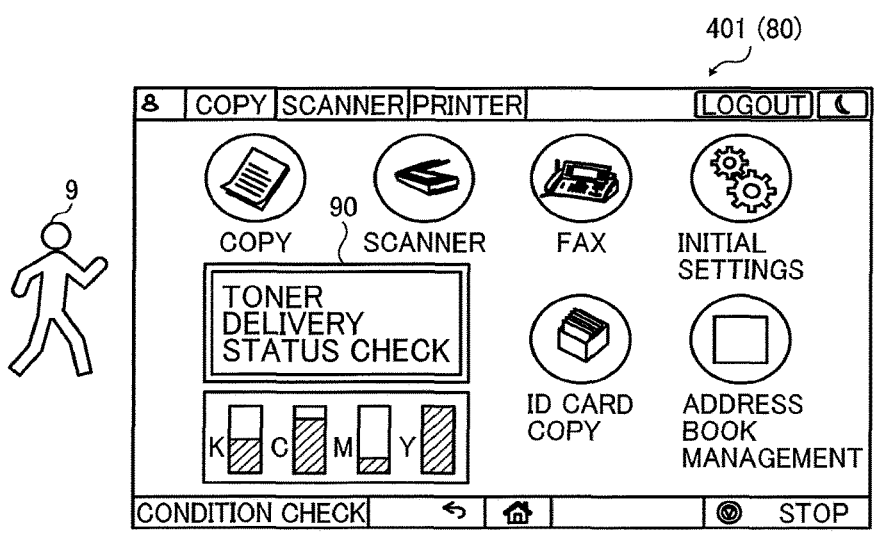

FIGS. 2A to 2C are diagrams illustrating an example of content displayed by an image forming apparatus 80 as an example of electronic device according to an embodiment. The image forming apparatus 80 is communicably connected with an information distribution apparatus 70 and a remote monitoring apparatus 40. FIG. 2A illustrates a home screen 401, displayed to a user 9 who has logged in the image forming apparatus 80. The home screen 401 is a screen displaying icons for various applications in a selectable manner. The home screen 401 also displays an information display icon 90 called widget application. The information display icon 90 includes text and others for describing the details of an event and guiding to the display of a content, thereby to notify that the information distribution apparatus 70 has some content prepared.

(1) The image forming apparatus 80 holds a list of events having occurred therein (event list). The event is an event that has occurred in the image forming apparatus 80. The event can also be referred to as incident, happening, occurrence, or any term that has the equivalent meaning. For example, the event may be various failures (paper jam, toner end, and the like), transition to abnormal state, specific actions, and others.

(2) The remote monitoring service can be subscribed for the image forming apparatus 80 according to the embodiment. Accordingly, when an event has occurred, the image forming apparatus 80 notifies the remote monitoring apparatus 40 the details of the event, and the remote monitoring apparatus 40 notifies the information distribution apparatus 70 of the details of the event. Therefore, the image forming apparatus 80 can acquire the information display icon 90 according to the event from the information distribution apparatus 70.

(3) The image forming apparatus 80 stores the information display icons 90 according to the kinds of events and switches the information display icons 90 on a regular basis. The information display icon 90 includes a message describing the details of an event or guiding to the display of a content. FIGS. 2A and 2B illustrate different information display icons 90. Since the message is kept displayed, the user 9 can easily grasp the details of the information display icon 90.

(4) As illustrated in FIG. 2C, when the user 9 reads the message in the information display icon 90 and presses the information display icon 90, the image forming apparatus 80 communicates with the information distribution apparatus 70 according to the URL included in the information display icon 90 to acquire the content according to the event. The communication destination indicated by the URL may not be the information distribution apparatus 70.

(5) The image forming apparatus displays the content.

In this way, the information distribution system according to the embodiment holds the information display icons 90 associated with contents to allow the user 9 to check what contents can be distributed. The user 9 can display a content by a press of the information display icon 90 and view the content (information) easily.

In this disclosure, the information to be distributed to the electronic device for the user is any information that is useful to the user. For example, the information can be said to be information that is viewed by users from which manufacturers (including providers) of electronic devices can receive benefits. In the embodiment, the information is described as content.

The distribution of the information also includes transmission, provision, dispatch, and display of the information.

The subscription to the service means that there is an agreement on the service made between a customer and a manufacturer of the electronic device. Subscription information refers to information about the details of the subscription. The service refers to some useful treatments for the customer of the electronic device. For example, the service may be a service of remotely monitoring the electronic device (remote monitoring service) or a service of automatic consumables delivery by a delivery firm (automatic consumables delivery service).

The information on electronic device is information for identifying the condition of electronic components. In the embodiment, the information on electronic device is described as device information.

The information on display component is information for the electronic device to display a display component. In the embodiment, the information on display component is described as information display icon 90.

<System Configuration Example>

Figure 3:
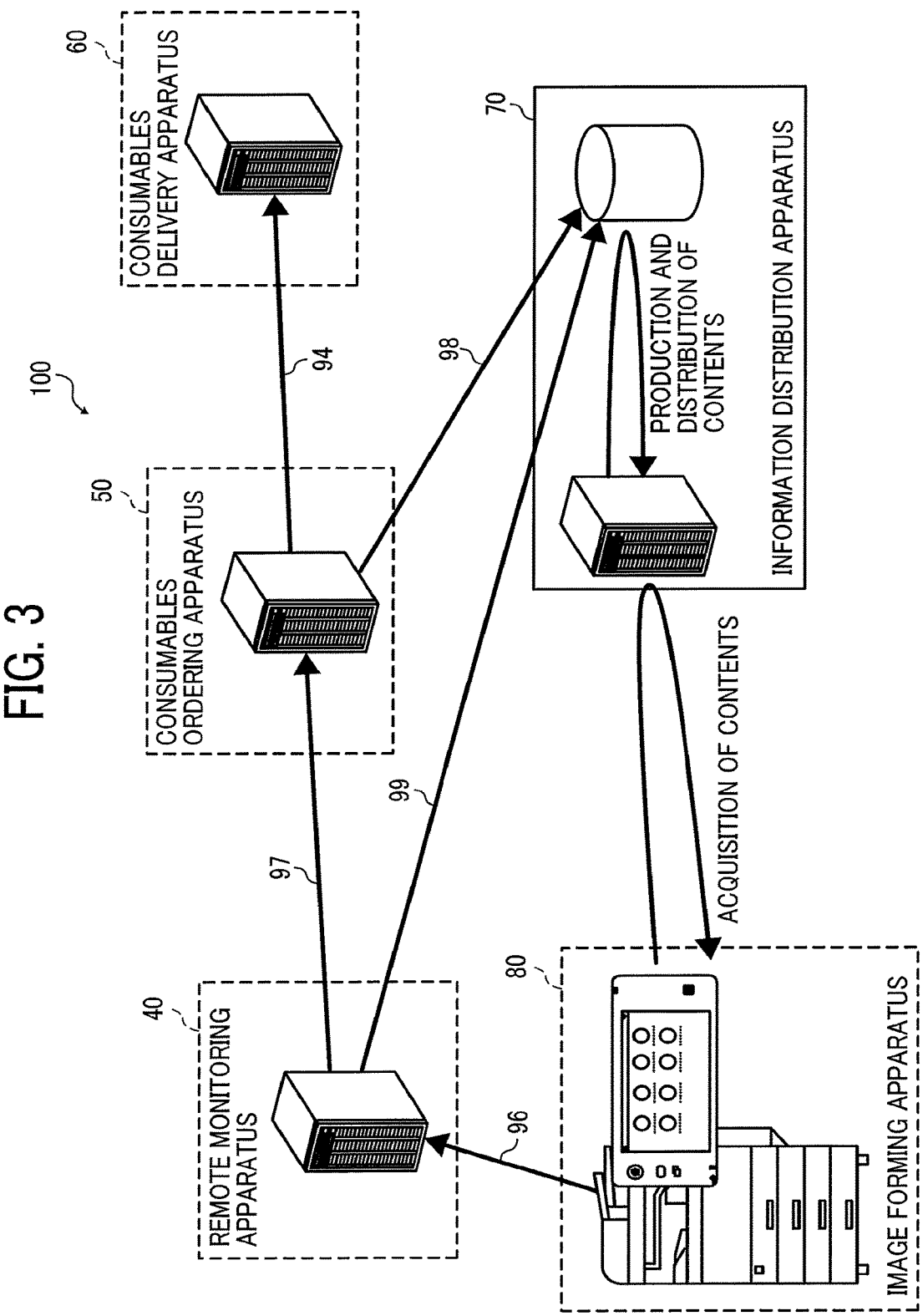
FIG. 3 is a diagram schematically illustrating an example of general arrangement of an information distribution system.

FIG. 3 is a diagram schematically illustrating an example of general arrangement of an information distribution system 100. The information distribution system 100 includes an image forming apparatus 80, a remote monitoring apparatus 40 that monitors the image forming apparatus 80, a consumables ordering apparatus 50 that receives a request for ordering consumables from the remote monitoring apparatus 40, a consumables delivery apparatus 60 that receives a request for delivering consumables from the consumables ordering apparatus 50, and the information distribution apparatus 70 that provides a content to the image forming apparatus 80.

The constituent elements in the information distribution system 100 are communicably connected via a network. The network is established by a LAN in a facility where the image forming apparatus 80 is installed, a provider network in a provider connecting the LAN to the Internet, a line provided by a telecommunication carrier, and others. When the network has a plurality of LANs, the network is called WAN or the Internet. The network may be established in a wired or wireless manner or may be established by a combination of wired and wireless connectivity. In addition, when the image forming apparatus 80 has a circuit-switched communication device such as 3G or LTE device, the image forming apparatus 80 can connect to the Internet via the line provided by the telecommunications carrier. The Internet refers to a network where computers are globally connected and networks around the world are connected together.

The remote monitoring apparatus 40 is an information processing apparatus that receives device information described later from the image forming apparatus 80 and monitors whether the image forming apparatus 80 is normally operating. When the device information includes a predetermined event, the remote monitoring apparatus 40 sends a content production request related to the event and the details of the event to the information distribution apparatus 70. Accordingly, the image forming apparatus 80 can display the content corresponding to the event having occurred in the image forming apparatus 80. In addition, when the customer has subscribed to the automatic consumables delivery service, the remote monitoring apparatus 40 transmits consumables ordering information 97 to the consumables ordering apparatus 50 according to the remaining amount of toner in the device information.

The remote monitoring apparatus 40 also regularly transmits to the information distribution apparatus 70 subscription information 99 on the service subscription for the image forming apparatus 80. This allows the information distribution apparatus 70 to produce a content according to the subscription information 99.

The service includes a remote monitoring service and an automatic delivery service. In the embodiment, the remote monitoring service has been already subscribed for the image forming apparatus 80. The automatic delivery service is a service by which the consumables delivery apparatus 60 automatically delivers consumables without the need for the user 9 to order the consumables.

The consumables ordering apparatus 50 is an information processing apparatus that manages the ordering to delivery of consumables and transmits a consumables delivery request to the consumables delivery apparatus 60 based on the consumables ordering information 97. After the transmission of the consumables delivery request, the consumables ordering apparatus 50 manages the delivery status and the like until completion of the delivery and performs a process for charging the customer a fee after the delivery.

The consumables ordering apparatus 50 is an information processing apparatus that transmits to the information distribution apparatus 70 consumables delivery status 98 on a regular basis. This allows the information distribution apparatus 70 to produce a consumables delivery status content 402.

The information distribution apparatus 70 produces the information display icon 90 and the content, and distributes the same in response to a request from the image forming apparatus 80. The image forming apparatus 80 acquires the information display icon 90 at a predetermined timing and acquires the content according to user operation. The content is produced at a predetermined timing, such as twice per day, for example. This allows the image forming apparatus 80 to acquire the content quickly after making a request.

The image forming apparatus 80 is an example of electronic device. The image forming apparatus 80 forms an image on a print medium such as paper sheet and outputs the same. The image forming apparatus 80 is provided with a control panel (including a display device such as a display) described later and displays a content on the control panel. The electronic device may not be the image forming apparatus 80 but may be a projector, an electronic blackboard, a teleconference or videoconference terminal, a car navigation device, a digital camera, or the like as far as it has a display device. In addition, the image forming apparatus 80 may be called printer, photocopier, copying machine, multi-function peripheral (MFP), multi-function machine, scanner, facsimile, or the like.

The image forming apparatus 80 (a main unit 10 described later) has a pre-installed application for providing the function of transmitting device information 96 described later to the remote monitoring apparatus 40 (hereinafter, referred to as "device information provision application"). The image forming apparatus 80 (an operation unit 20 described later) also has a pre-installed application for providing the function of requesting a content to the information distribution apparatus 70 and the function of displaying a content (hereinafter, referred to as "information distribution application").

Each of the remote monitoring apparatus 40, the consumables ordering apparatus 50, the consumables delivery apparatus 60, and the information distribution apparatus 70 may also be called server. Each of the remote monitoring apparatus 40, the consumables ordering apparatus 50, the consumables delivery apparatus 60, and the information distribution apparatus 70 is formed from one or more servers and is called server system.

<Example of Hardware Configuration>

Figure 4:
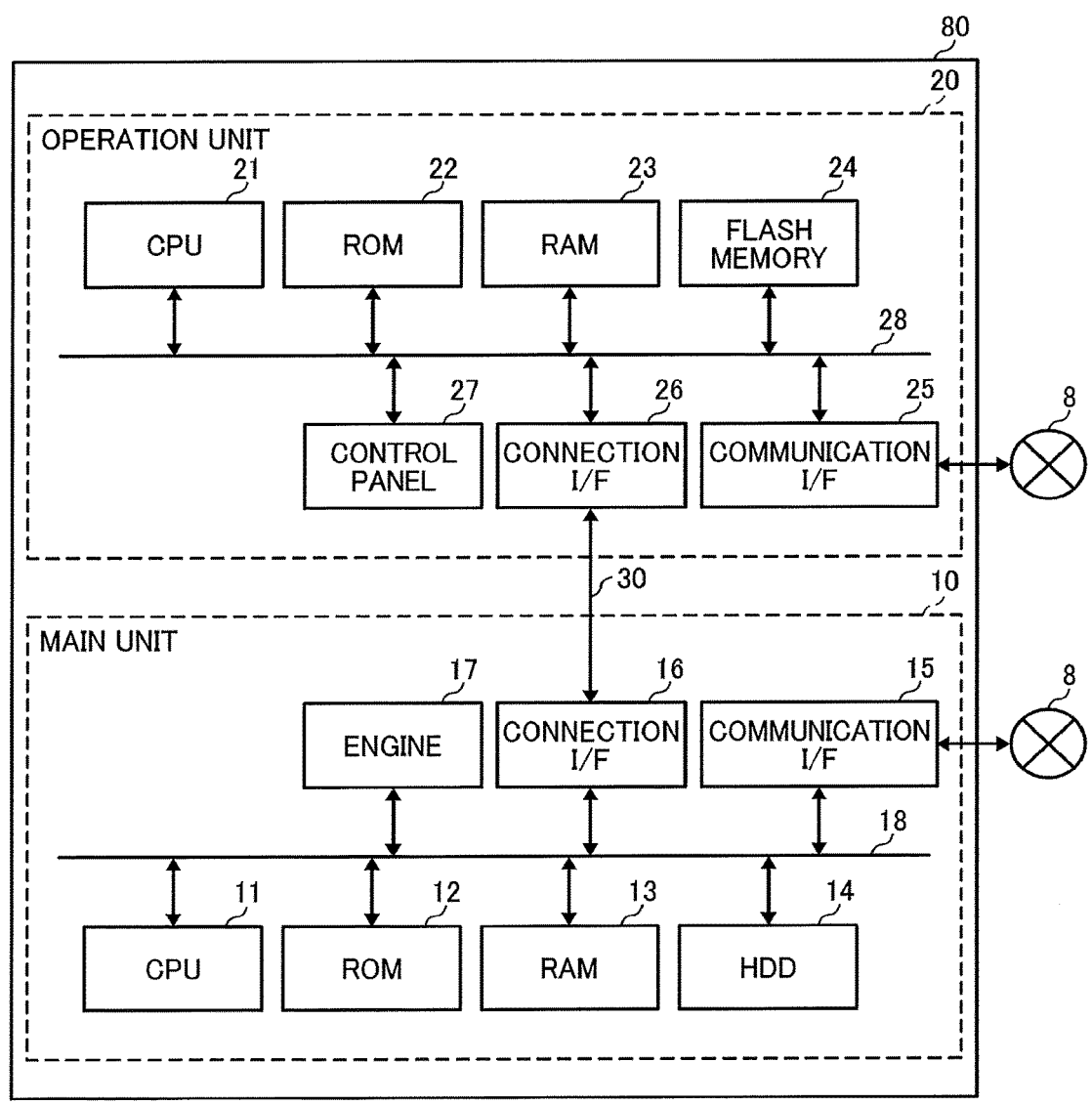
FIG. 4 is a diagram illustrating an example of hardware configuration of an image forming apparatus.

FIG. 4 is a diagram illustrating an example of hardware configuration of the image forming apparatus 80. As illustrated in FIG. 4, the image forming apparatus 80 includes a main unit 10 and an operation unit 20. The main unit 10 and the operation unit 20 are communicably connected to each other via a dedicated communication path 30. The communication path 30 may be a universal serial bus (USB) path, for example, or may be an arbitrary-standard path regardless of wired or wireless connectivity.

The main unit 10 can perform an action according to the operation received by the operation unit 20. The main unit 10 can also communicate with an external device such as a client personal computer (PC) and perform an action according to the instruction received from the external device.

Next, a hardware configuration of the main unit 10 will be described. As illustrated in FIG. 4, the main unit 10 includes a central processing unit (CPU) 11, a read only memory (ROM) 12, a random access memory (RAM) 13, a hard disk drive (HDD) 14, a communication interface (I/F) 15, a connection I/F 16, and an engine 17, all of which are connected together via a system bus 18. For the sake of description, FIG. 4 illustrates an example of configuration of the main unit 10 with the HDD 14. Alternatively, the main unit 10 may not have the HDD 14 or secure a sufficient storage area, for example.

The CPU 11 centrally controls operations of the main unit 10. The CPU 11 executes a program stored in the ROM 12 or the HDD 14 using the RAM 13 as a work area to control the entire operations of the main unit 10 and implement various functions such as copy function, scanner function, fax function, and printer function.

The communication I/F 15 is an interface for connection to a network 8. The connection I/F 16 is an interface for communication with the operation unit 20 via the communication path 30.

The engine 17 is hardware that performs processes other than general information processing and communication processing, for example, to implement the copy function, scanner function, fax function, and printer function. For example, the engine 17 includes a scanner (image reading unit) that scans and reads an image from a document, a plotter (image forming unit) that prints a sheet material such as a paper sheet, a fax unit that carries out fax communications, and others. The engine 17 may further include optional devices such as a finisher that sorts printed sheet materials and an automatic document feeder (ADF) that feeds a document automatically.

Next, a hardware configuration of the operation unit 20 will be described. As illustrated in FIG. 4, the operation unit 20 includes a CPU 21, a ROM 22, a RAM 23, a flash memory 24, a communication I/F 25, a connection I/F 26, and an control panel 27, all of which are connected together via a system bus 28. For the sake of description, FIG. 4 illustrates an example of configuration of the operation unit 20 with the flash memory 24. Alternatively, the operation unit 20 may not have the flash memory 24, for example. In fact, the image forming apparatus 80 may not have a storage device for storing a received content.

Figure 5:
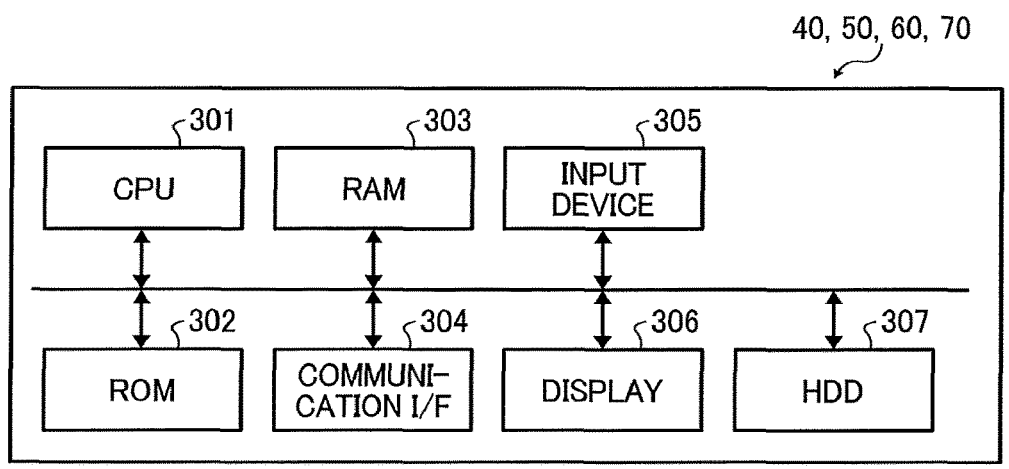
FIG. 5 is a diagram illustrating an example of hardware configuration of each of a remote monitoring apparatus, a consumables ordering apparatus, a consumables delivery apparatus, and an information distribution apparatus.

FIG. 5 is a diagram illustrating an example of hardware configuration of the remote monitoring apparatus 40, the consumables ordering apparatus 50, the consumables delivery apparatus 60, and the information distribution apparatus 70. For the descriptive purposes, the remote monitoring apparatus 40 will be described here. The remote monitoring apparatus 40 includes a CPU 301, a ROM 302, a RAM 303, a communication I/F 304, an input device 305, and a display 306. The CPU 301 controls comprehensively operations of the remote monitoring apparatus 40. The ROM 302 is a non-volatile memory that stores various data such as programs. The RAM 303 is a volatile memory that serves as a work area for the various processes performed by the CPU 301. The communication I/F 304 is an interface for connection to the network 8. The input device 305 is a device used by the user to input an operation, and includes a mouse, a keyboard, and others, for example. The display 306 is a device that displays various kinds of information and includes a liquid crystal display device or the like, for example.

Hardware configurations of the consumables ordering apparatus 50, the consumables delivery apparatus 60, and the information distribution apparatus 70 is substantially the same as that of the remote monitoring apparatus 40, such that description thereof is omitted.

The remote monitoring apparatus 40, the consumables ordering apparatus 50, the consumables delivery apparatus 60, or the information distribution apparatus 70 is preferably compatible with cloud computing. The cloud computing is a utility form in which network resources are used without consciousness of specific hardware resources.

The hardware configuration illustrated in the drawing is not necessarily stored in one housing or provided as a whole entity but includes hardware elements preferably included in the remote monitoring apparatus 40. In addition, due to the compatibility with cloud computing, the physical configuration of the remote monitoring apparatus 40 in the embodiment may not be fixed but the remote monitoring apparatus 40 may be configured such that hardware resources are dynamically connected or disconnected depending on a load.

<Software Configuration>

Figure 6:
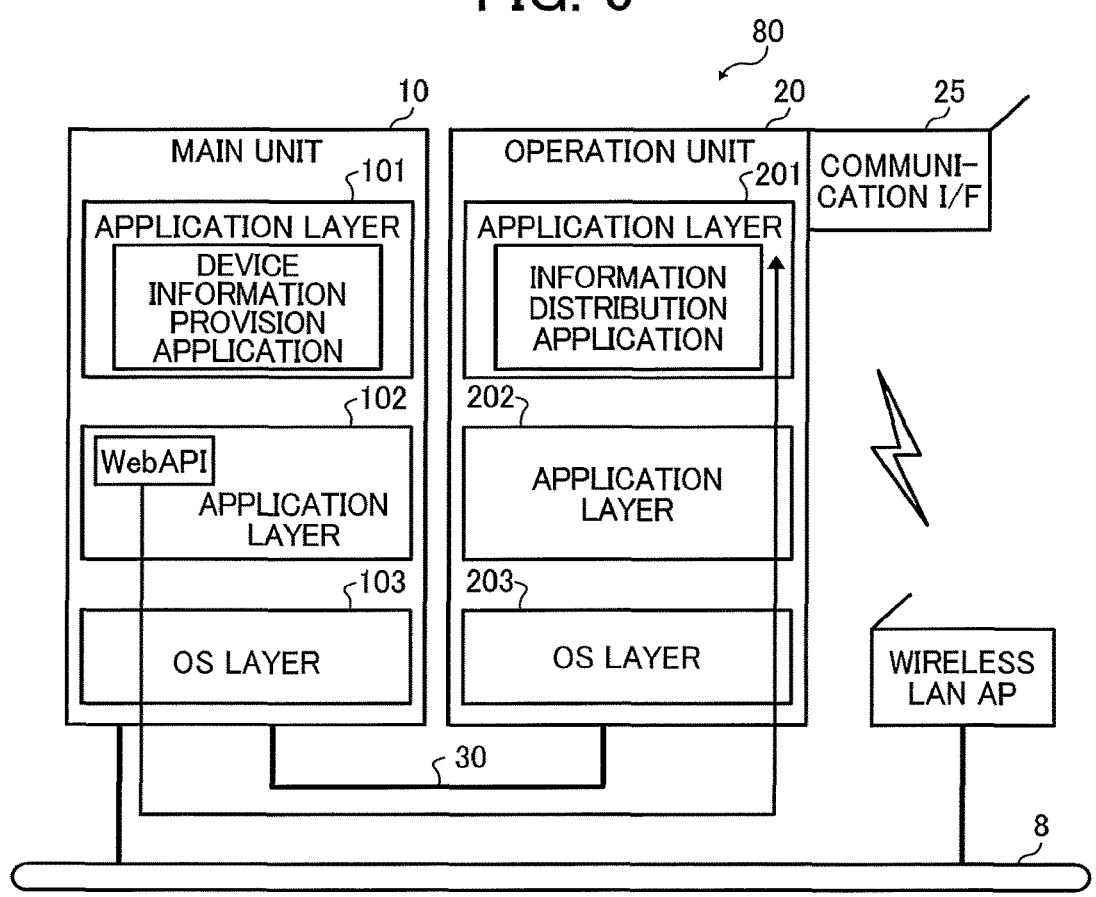
FIG. 6 is a schematic diagram illustrating an example of software configuration of the image forming apparatus.

FIG. 6 is a schematic diagram illustrating an example of software configuration of the image forming apparatus 80. As illustrated in FIG. 6, the main unit 10 has an application layer 101, a service layer 102, and an operating system (OS) layer 103. The entities of the application layer 101, the service layer 102, and the OS layer 103 are respective software components stored in the ROM 12, the HDD 14, or the like. The CPU 11 executes these software components to provide various functions.

The software in the application layer 101 includes application software for activating hardware resources to perform a predetermined function (hereinafter, referred to as simply "application"). For example, the application may include a copy application for performing the copy function, a scanner application for providing the scanner function, a fax application for performing the fax function, a printer application for performing the printer function, a device information provision application, and others.

The software in the service layer 102 includes software that intervenes between the application layer 101 and the OS layer 103 to provide an interface for the application to use the hardware resources of the main unit 10. More specifically, the software in the service layer 102 includes software for performing the functions of accepting a request for activating the hardware resources and making adjustments for the activation request. The activation request accepted by the service layer 102 may be a request for reading by the scanner or a request for printing by the plotter.

The interface function of the service layer 102 is provided to not only the application layer 101 of the main unit 10 but also an application layer 201 of the operation unit 20. That is, the application layer 201 (applications) of the operation unit 20 can implement the functions using the hardware resources (for example, the engine 17) of the main unit 10 via the interface function of the service layer 102. The interface function of the service layer 102 is provided by WebAPI, for example. The operation unit 20 and the main unit 10 can communicate with each other with the dedicated communication path 30 as a network.

The software in the OS layer 103 is basic software (operating system (OS)) for performing the basic function of controlling the hardware of the main unit 10. The software in the service layer 102 converts requests for using the hardware resources from the applications into commands that can be interpreted by the OS layer 103, and passes the same to the OS layer 103. Then, the software of the OS layer 103 executes the commands to cause the hardware resources to perform operations corresponding to the requests from the applications.

Similarly, the operation unit 20 includes the application layer 201, a service layer 202, and an OS layer 203. The application layer 201, the service layer 202, and the OS layer 203 of the operation unit 20 are similar to those of the main unit 10 in hierarchical structure. However, the functions provided by the applications in the application layer 201 and the kinds of activation requests acceptable by the service layer 202 are different from those in the main unit 10. The applications in the application layer 201 may be software for activating the hardware resources of the operation unit 20 to provide predetermined functions but are basically software for providing user interface (UI) functions (UI function for copier, UI function for scanner, UI function for fax, UI function for printer, UI function for initial setting, and others) for performing operations and producing displays related to the functions of the main unit 10 (the copy function, the scanner function, the printer function, and the initial setting function), and a browser function. The applications in the application layer 201 include an information distribution application and others.

In the embodiment, to maintain the independence of the functions, the software in the OS layer 103 of the main unit 10 and the software in the OS layer 203 of the operation unit 20 are different from each other. That is, the main unit 10 and the operation unit 20 operate independently on different operating systems. For example, the software in the OS layer 103 of the main unit 10 may be NetBSD (registered trademark), and the software in the OS layer 203 of the operation unit 20 may be Android (registered trademark).

As described above, in the image forming apparatus 80 of the embodiment, the main unit 10 and the operation unit 20 operate on separate operating systems, and the communications between the main unit 10 and the operation unit 20 are not communications between processes in a common apparatus but communications between different apparatuses. The communications between the main unit 10 and the operation unit 20 correspond to an action of transmitting information accepted by the operation unit 20 (instructions from the user) to the main unit 10 (command communications) and an action of the main unit 10 notifying the operation unit 20 of an event. In this case, the operation unit 20 can perform command communications with the main unit 10 to use the functions of the main unit 10. The event of which the main unit 10 notifies the operation unit 20 may include the execution status of operation by the main unit 10, the details of the settings made on the main unit 10.

In the embodiment, the operation unit 20 is powered from the main unit 10 through the dedicated communication path 30. This allows a control of power supply to the operation unit 20 separately (independently) from a control of power supply to the main unit 10.

<Functional Configuration>

Figure 7:
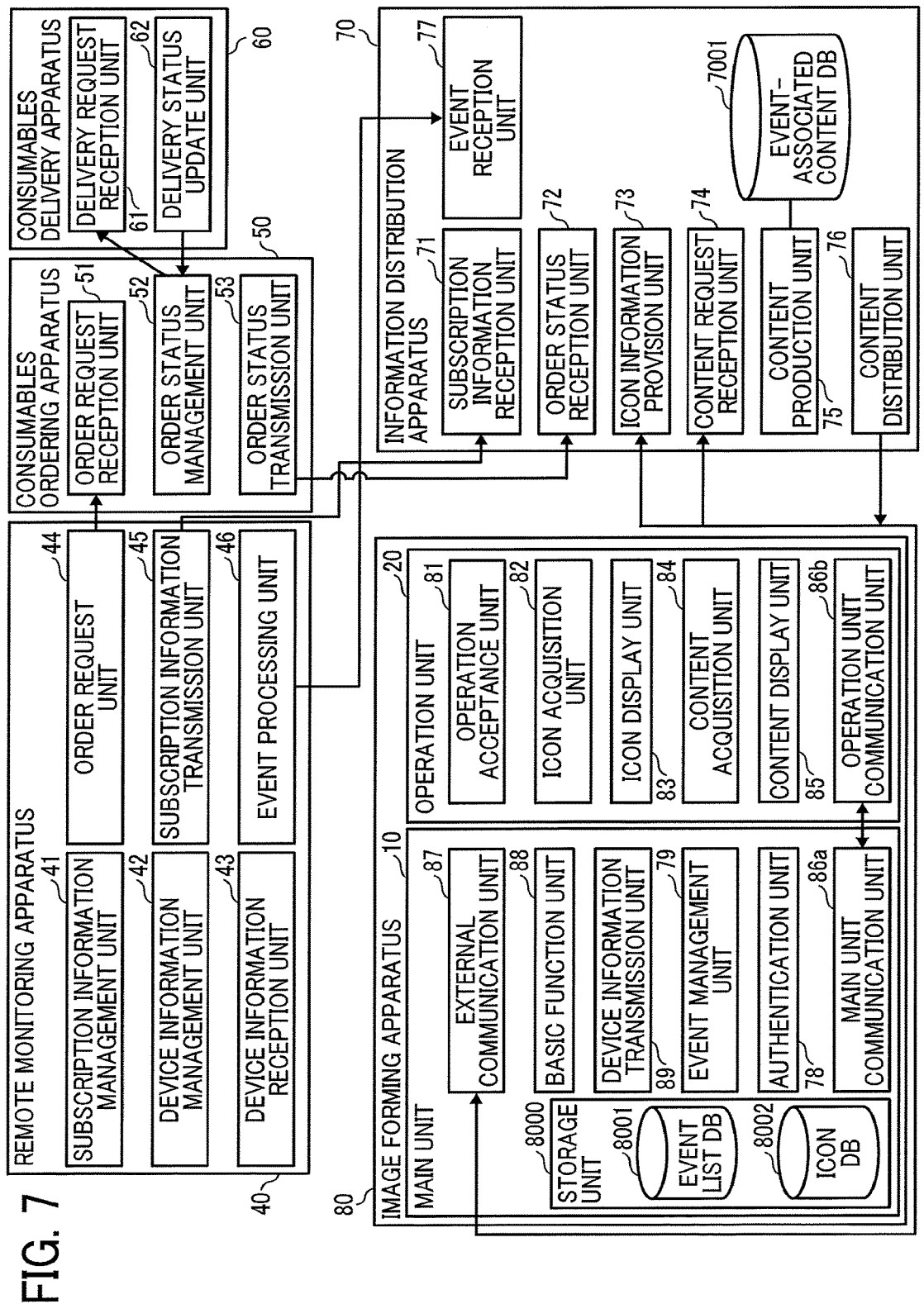
FIG. 7 is a diagram illustrating an example of functional blocks of the image forming apparatus, the remote monitoring apparatus, the consumables ordering apparatus, the consumables delivery apparatus, and the information distribution apparatus included in the information distribution system.

Next, the functions of the apparatuses in the information distribution system 100 will be described with reference to FIG. 7. FIG. 7 is a diagram illustrating an example of functional blocks of the image forming apparatus 80, the remote monitoring apparatus 40, the consumables ordering apparatus 50, the consumables delivery apparatus 60, and the information distribution apparatus 70 in the information distribution system 100.

<<Image Forming Apparatus 80>>

The image forming apparatus 80 includes the main unit 10 and the operation unit 20. The main unit 10 includes an external communication unit 87, a basic functional unit 88, a device information transmission unit 89, an event management unit 79, an authentication unit 78, and a main unit communication unit 86a. These functional units of the main unit 10 are implemented by any of the constituent elements illustrated in FIG. 4 operating under a command from the CPU 11 according to a program expanded from the HDD 14 to the RAM 13. This program is distributed from a program distribution server or is delivered in the form of storage medium.

The operation unit 20 includes an operation acceptance unit 81, an icon acquisition unit 82, an icon display unit 83, a content acquisition unit 84, a content display unit 85, and an operation unit communication unit 86b. These functional units of the operation unit 20 are implemented by any of the constituent elements illustrated in FIG. 4 operating under a command from the CPU 21 according to a program expanded from the flash memory 24 to the RAM 23. This program is distributed from a program distribution server or is delivered in the form of storage medium.

The external communication unit 87 is implemented by the CPU 11 illustrated in FIG. 4 executing the program and controlling the communication I/F 15 or the like to transmit and receive various data via the network 8.

The basic functional unit 88 is implemented by the CPU 11 illustrated in FIG. 4 executing the program and controlling the engine 17 or the like to provide a basic function of the image forming apparatus 80. Specifically, the basic functional unit 88 provides the functions of printer, printing, scanning, fax, or projector.

The device information transmission unit 89 is implemented by the CPU 11 illustrated in FIG. 4 executing the program or the like to transmit the device information to the remote monitoring apparatus 40 via the external communication unit 87. The device information will be described later with reference to Table 1.

The event management unit 79 is implemented by the CPU 11 illustrated in FIG. 4 executing the program or the like to register an event detected by the basic functional unit 88 in an event list DB (database) 8001. When the event is eliminated, the event management unit 79 deletes the event from the event list DB 8001. The event contains information on the conditions of the main part. The information on the conditions of the main part indicates the remaining toner amount, the count of printed sheets, error state, and the like.

The authentication unit 78 is implemented by the CPU 11 illustrated in FIG. 4 executing the program or the like to refer to a user DB to authenticate the user. The user DB stores user IDs, user names, passwords, mail addresses, authorization information (administrator, general user, guest, or the like), and others registered therein. When the user ID (or the user name) and the password entered by the user match with those in the user DB, the authentication unit 78 determines that the user is authenticated. When the user ID and the password do not match with those in the user DB, the authentication unit 78 determines that the user is not authenticated. Upon completion of the authentication, the authentication unit 78 permits the user to perform a log-in. The log-in may be performed using an IC card or biological information such as fingerprints.

The main unit communication unit 86a is implemented by the CPU 11 illustrated in FIG. 4 executing the program and controlling the connection I/F 16 or the like to transmit and receive various data to and from the operation unit 20.

A storage unit 8000 stores various kinds of information implemented by the HDD 14 illustrated in FIG. 4. The storage unit 8000 stores an event list DB 8001, an icon DB 8002, and a user DB therein.

The operation acceptance unit 81 is implemented by the CPU 21 illustrated in FIG. 4 executing the program and controlling the control panel 27 or the like to accept various operations from the user 9.

The icon acquisition unit 82 is implemented by the CPU 21 illustrated in FIG. 4 executing the program to acquire the information display icon 90 from the information distribution apparatus 70 via the operation unit communication unit 86b.

The icon display unit 83 is implemented by the CPU 21 illustrated in FIG. 4 executing the program and controlling the control panel 27 or the like to display the information display icon 90 on the control panel. The icon display unit 83 is implemented by a widget application.

The content acquisition unit 84 is implemented by the CPU 21 illustrated in FIG. 4 executing the program or the like. When the user 9 presses the information display icon 90, the content acquisition unit 84 acquires a content from a resource on the network specified by the URL held in the information display icon 90 via the operation unit communication unit 86b.

The content display unit 85 is implemented by the CPU 21 illustrated in FIG. 4 executing the program and controlling the control panel or the like to display the content acquired by the content acquisition unit 84 on the control panel 27.

The operation unit communication unit 86b is implemented by the CPU 21 illustrated in FIG. 4 executing the program and controlling the connection I/F 26 or the like to transmit and receive various data to and from the main unit 10.

TABLE 1

| Model | Machine number | Remaining toner amount | Counter information | Normal/abnormal |
|---|---|---|---|---|
| 3F55 | 111111 | 0% | 50 | Normal |

Table 1 provides device information in table form. The device information has the items model, machine number, remaining toner amount, counter information, and abnormality. The model is information for identifying the product name and the product segmentation of the image forming apparatus 80. The machine number is the serial number of the image forming apparatus 80 of the model. A pair of model and machine number uniquely specifies the image forming apparatus 80 and constitutes information for identification of the image forming apparatus 80. For the remaining toner amount, the remaining amounts of toners of respective colors (color descriptions are omitted in Table 1) are expressed as percentages or the like. The counter information indicates the accumulated number of pages printed in the past by the image forming apparatus 80. The abnormality indicates the presence or absence of an abnormality in the image forming apparatus 80. The abnormality is equivalent to an event. For example, when the device information with the remaining toner amount equal to or smaller than a threshold is transmitted to the remote monitoring apparatus 40, the remote monitoring apparatus 40 determines that the toner is to be ordered. Otherwise, predetermined event information called toner end is transmitted to the remote monitoring apparatus 40. Besides, events such as paper jam are transmitted to the remote monitoring apparatus 40. When an event indicating an abnormality is transmitted, the information on the abnormality includes the event ID. Alternatively, the remote monitoring apparatus 40 may determine the event ID from the details of the abnormality.

TABLE 2

| Event ID | Event list |
|---|---|
| 1 | Near out of toner |
| 2 | Out of toner |
| 3 | Failure event (Jam) |
| 4 | . . . |

Table 2 is an example of event list stored in the event list DB 8001. The event list has events registered in association with the event IDs. The event list is a list of currently occurring events. The event list may also include the times of occurrence. In this disclosure, the ID is an abbreviation of identification that means identifier or identification information. The ID refers to name, code, character string, numerical value, or a combination of one or more of them used to uniquely distinguish specific one from a plurality of targets. The same is applicable to IDs other than the event ID.

When detecting the occurrence of an event in the image forming apparatus 80, the basic functional unit 88 notifies the event management unit 79 of the event ID, and the event management unit 79 records the event ID and the event. When detecting the elimination of the event, the basic functional unit 88 notifies the event management unit 79 of the event ID of the eliminated event, and the event management unit 79 erases the eliminated event from the event list. The event list in Table 2 is provided for explanation, and the event list DB 8001 includes at least the event IDs.

TABLE 3

| Content number | Icon image data | Tapping access URL | Content name | Display authorization | Event ID |
|---|---|---|---|---|---|
| 001 | 123.jpeg | https://sample/index.hrml | Toner delivery status check | Administrator | 2 |
| 002 | 456.jpeg | https://sample2/index.hrml | Convenient toner ordering subscription | General users and administrator | 2 |
| 003 | 789.jpeg | https://sample3/index.hrml | Paper jam has occurred | Guests, administrator, and general users | 3 |
| 004 | 027.jpeg | https://sample4/index.hrml | Remote monitoring service | Guests, administrator, and general users | 2 |

Table 3 provides the information on the information display icon 90 stored in the icon DB 8002 in table form. The information on the information display icon 90 has the items content number, icon image data, tap-time access URL, content name, display authorization, and event ID. In the embodiment, these items may be collectively referred to as information display icon 90.

The content number is information for identifying a content. Since a plurality of contents can be distinguished from one another in one image forming apparatus 80, the content number is unique to each image forming apparatus 80. The icon image data is image data displayed as information display icon 90. The tap-time access URL is address information accessed by the image forming apparatus 80 when the user 9 presses the information display icon 90 (this is equivalent to the URL described above with reference to FIG. 2). The content corresponding to an event is held in the address information (URL). The event can also be referred to as link destination or link information. The content name is the name of the information display icon 90 for the user 9 to identify the information display icon 90. The information display icon 90 indicates the content name as the message described above with reference to FIG. 2.

The display authorization is the authorization for display of a content. The image forming apparatus is used by a wide variety of users 9 such as administrator, general users, or guests. The information from the information distribution system 100 is distributed to the appropriate user 9 with increasing distribution effect. The display authorization indicates the authorization with which the user 9 can perform an operation to display the content.

The event ID is identical to the event ID in the event list DB 8001, which is used to associate the event with the information display icon 90. The icon acquisition unit 82 monitors the event in the event list DB 8001 (or is notified of the event by the event management unit 79). When there is no longer event ID in the event list, the icon acquisition unit 82 deletes the information display icon 90 with the event ID.

In principle, one information display icon 90 is associated with one event. However, even when all the events are eliminated, there may exist some contents that are desirably provided to the user. The information display icons 90 for such contents are not associated with any event. The information display icons 90 displayed even without event and the contents associated with the information display icons 90 are called icons and contents for initial screen. They are stored in the operation unit 20.

Except for the content numbers, the icon image data, the tap-time access URLs, the content names, and the display authorizations are managed as static information associated with events by the information distribution apparatus 70. The event IDs are uniquely determined, and the content numbers are arbitrary numbers not duplicated in one image forming apparatus 80.

TABLE 4

| User ID | User name | Password | Mail address | Authorization information |
|---|---|---|---|---|
| U001 | suzuki | **** | 1@sample.co.jp | Administrator |
| U002 | itoh | **** | 2@sample.co.jp | General users |
| U003 | satoh | **** | 3@sample.co.jp | Guests |

Table 4 provides user information stored in the user DB in table form. The user DB stores the items user ID, user name, password, mail address, and authorization information. The user ID is information for identifying the user, the user name is the name of the user, the password is information for the image forming apparatus 80 to authenticate the user, the mail address is the mail address of the user, and the authorization information is the authorization of the user.

<<The Remote Monitoring Apparatus 40>>

The remote monitoring apparatus 40 includes a subscription information management unit 41, a device information management unit 42, a device information reception unit 43, an order request unit 44, a subscription information transmission unit 45, and an event processing unit 46. These functional units of the remote monitoring apparatus 40 are implemented by any of the constituent elements illustrated in FIG. 5 operating under a command from the CPU 301 according to a program developed from the HDD 307 to the RAM 303. This program is distributed from a program distribution server or delivered in the form of storage medium.

The subscription information management unit 41 is implemented by the CPU 301 illustrated in FIG. 5 executing the program and using the HDD 307 or the like to manage the subscription information on the image forming apparatus 80. The subscription information will be described later with reference to Table 5.

The device information management unit 42 is implemented by the CPU 301 illustrated in FIG. 5 executing the program and using the HDD 307 or the like to manage the device information transmitted from the image forming apparatus 80.

The device information reception unit 43 is implemented by the CPU 301 illustrated in FIG. 5 executing the program and controlling the communication I/F 304 or the like to receive the device information from the image forming apparatus 80.

The order request unit 44 is implemented by the CPU 301 illustrated in FIG. 5 executing the program and controlling the communication I/F 304 or the like to refer to the subscription information and transmit the consumables ordering information 97 to the consumables ordering apparatus 50 with the event that the remaining amount of consumables is equal to or less than a threshold or the event of toner end, for the image forming apparatus 80 with a subscription to the automatic consumables delivery service.

The subscription information transmission unit 45 is implemented by the CPU 301 illustrated in FIG. 5 executing the program and controlling the communication I/F 304 or the like to transmit regularly the subscription information managed by the subscription information management unit 41 to the information distribution apparatus 70.

The event processing unit 46 is implemented by the CPU 301 illustrated in FIG. 5 executing the program and controlling the communication I/F 304 or the like to, when the device information includes a predetermined event, transmit a content production request to the information distribution apparatus 70. The content production request includes the model, the machine number, and the event ID. The predetermined event is registered in advance in the remote monitoring apparatus 40.

TABLE 5

| Model | Machine number | Presence or absence of subscription to automatic consumables delivery service |
|---|---|---|
| 3F55 | 111111 | Presence |
| 3F32 | 222222 | Absence |
| 3F51 | 333333 | Absence |
| 3F11 | 444444 | Presence |

Table 5 provides the subscription information in table form. The subscription information is a table-form database including the items model, machine number, the presence or absence of automatic consumables delivery service as one record. The model and the machine number are identical to those in Table 1. The presence or absence of automatic consumables delivery service indicates whether the automatic consumables delivery service is subscribed for the image forming apparatus 80. That is, the presence or absence of automatic consumables delivery service indicates whether there is a setting that the consumables for the image forming apparatus 80 can be (automatically) ordered.

The subscription information is transmitted to the information distribution apparatus 70 on a regular basis (once a day, for example). This allows the information distribution apparatus 70 to distribute the content corresponding to the subscription information to the image forming apparatus 80. The subscription information is input by sales personnel of the image forming apparatus 80.

<<The Consumables Ordering Apparatus 50>>

The consumables ordering apparatus 50 includes an order request reception unit 51, an order status management unit 52, and an order status transmission unit 53. These functional units of the consumables ordering apparatus 50 are implemented by any of the constituent elements illustrated in FIG. 5 operating under a command from the CPU 301 according to a program developed from the HDD 307 to the RAM 303. This program is distributed from a program distribution server or is delivered in the form of storage medium.

The order request reception unit 51 is implemented by the CPU 301 illustrated in FIG. 5 executing the program and controlling the communication I/F 304 or the like to receive the consumables ordering information 97 from the remote monitoring apparatus 40.

The order status management unit 52 is implemented by the CPU 301 illustrated in FIG. 5 executing the program and using the HDD 307 or the like to manage the current consumables delivery status 98. Table 6 describes the consumables delivery status 98.

When acquiring a request for updating delivery status from the consumables delivery apparatus 60, the order status management unit 52 updates the delivery status in the consumables delivery status 98 in response to the updating request.

The order status transmission unit 53 is implemented by the CPU 301 illustrated in FIG. 5 executing the program and controlling the communication I/F 304 or the like to transmit the consumables delivery status 98 to the information distribution apparatus 70.

TABLE 6

| Model | Machine number | Consumable name | Reference number | Delivery status | Ordering date | Estimated delivery date |
|---|---|---|---|---|---|---|
| 3F55 | 111111 | Black toner | 001 | Delivery requested | 2016 Oct. 25 | 2016 Oct. 27 |
| 3F55 | 111111 | Magenta toner | 002 | Delivery requested | 2016 Oct. 25 | 2016 Oct. 27 |
| 3F11 | 222222 | Black toner | 003 | Non-delivered | 2016 Sep. 25 | 2016 Sep. 27 |

Table 6 provides the information included in the consumables delivery status in table form. The consumables delivery status 98 has the model, the machine number, the name of consumables, reference number, delivery status, order date, and estimated delivery date. The model and the machine number are identical to those in Table 1. The name of consumables is the name of the consumables ordered. The reference number is information for identifying the order of the consumables, which is equivalent to the order number. The delivery status indicates the status of the consumables under delivery. The delivery status includes delivery requested, non-delivered (the absence of the customer or refusal from the customer to take the delivery), delivered, and the like. The order date is the date and time when the consumables ordering apparatus 50 orders the consumables. The estimated delivery date is the estimated date of delivery of the consumables, which is uniquely determined by the place of the image forming apparatus 80 and the presence or absence of the consumables in stock.

The consumables delivery status is collectively transmitted by the consumables ordering apparatus 50 to the information distribution apparatus 70 once a day, for example. After the transmission, the consumables ordering apparatus 50 transmits the delivery status as appropriate to the information distribution apparatus 70 at a timing when the delivery status is changed.

<<The Consumables Delivery Apparatus 60>>

The consumables delivery apparatus 60 includes a delivery request reception unit 61 and a delivery status updating unit 62. These functional units of the consumables delivery apparatus 60 are implemented by any of the constituent elements illustrated in FIG. 5 operating under a command from the CPU 301 according to a program developed from the HDD 307 to the RAM 303. This program is distributed from a program distribution server or is delivered in the form of storage medium.

The delivery request reception unit 61 is implemented by the CPU 301 illustrated in FIG. 5 executing the program and controlling the communication I/F 304 or the like to receive a delivery request from the consumables ordering apparatus 50.

The delivery status updating unit 62 is implemented by the CPU 301 illustrated in FIG. 5 executing the program and controlling the communication I/F 304 or the like to transmit a request for updating the delivery status to the consumables ordering apparatus 50. The delivery personnel inputs the delivery status as appropriate into a terminal carried with them. The consumables delivery apparatus 60 collects the information on the delivery status of the consumables under delivery from the terminal carried by the delivery personnel and manages the same in real time.

TABLE 7

| Reference number | Delivery status | Delivery date |
|---|---|---|
| 001 | Delivery completed | 2019 Oct. 27 |

Table 7 provides the delivery status update request to be transmitted by the consumables delivery apparatus 60 to the consumables ordering apparatus 50 in table form. The delivery status update request has reference number, delivery status, and delivery date. The reference number is the same as that in Table 6. The delivery status is the latest delivery status of which the consumables delivery apparatus 60 is notified by the delivery personnel. The delivery date is the date and time when the consumables were actually delivered to (arrived at) the customer. The delivery date field may be blank when the delivery status is to be updated until the delivery. The order status management unit 52 of the consumables ordering apparatus 50 can update the consumables delivery status with the reference number as a key. Besides, the delivery status update request may include the estimated delivery date and the like.

<<The Information Distribution Apparatus 70>>

The information distribution apparatus 70 includes a subscription information reception unit 71, an event reception unit 77, an order status reception unit 72, an icon information provision unit 73, a content request reception unit 74, a content production unit 75, and a content distribution unit 76. These functional units of the information distribution apparatus 70 are implemented by any of the constituent elements illustrated in FIG. 5 operating under a command from the CPU 301 according to a program developed from the HDD 307 to the RAM 303. This program is distributed from a program distribution server or is delivered in the form of storage medium.

The subscription information reception unit 71 is implemented by the CPU 301 illustrated in FIG. 5 executing the program and controlling the communication I/F 304 or the like to receive the subscription information 99 from the remote monitoring apparatus 40.

The event reception unit 77 is implemented by the CPU 301 illustrated in FIG. 5 executing the program and controlling the communication I/F 304 or the like to receive a content production request (model, machine number, and event ID) from the remote monitoring apparatus 40.

The order status reception unit 72 is implemented by the CPU 301 illustrated in FIG. 5 executing the program and controlling the communication I/F 304 or the like to receive the consumables delivery status 98 from the consumables ordering apparatus 50.

The icon information provision unit 73 is implemented by the CPU 301 illustrated in FIG. 5 executing the program or the like to produce the information display icon 90 based on the subscription information and the consumables delivery status and provide the information display icon to the image forming apparatus 80.

The content request reception unit 74 is implemented by the CPU 301 illustrated in FIG. 5 executing the program and controlling the communication I/F 304 or the like to receive a content distribution request from the image forming apparatus 80.

The content production unit 75 is implemented by the CPU 301 illustrated in FIG. 5 executing the program or the like to refer to an event-associated content DB 7001 to produce a content for each event based on the subscription information. This will be described later in detail.

The content distribution unit 76 is implemented by the CPU 301 illustrated in FIG. 5 executing the program and controlling the communication I/F 304 or the like to distribute the content to the image forming apparatus 80 having made the content request.

TABLE 8

| Event ID | Subscription state |
| --- | --- |
| 2 | Presence of subscription to delivery service C001, 002, 003 |
|   | Absence of subscription to delivery service C002, C003 |
| 3 | C004 |

Table 8 provides the information registered in the event-associated content DB 7001 in table form. The event-associated content DB 7001 has the items event ID, content ID, and subscription status in association with one another. The content ID is information for identifying the type of the content. The content ID associates with the user authorization information. A plurality of contents can be produced for one event allowing for the user authorization information.

The subscription status is referred to when different contents are produced according to the subscription. For example, contents C001, C002, and C003 are produced with a subscription to the automatic consumables delivery service, and the content C001 is not produced without a subscription to the automatic consumables delivery service.

<Operation Procedure>

Figure 8:
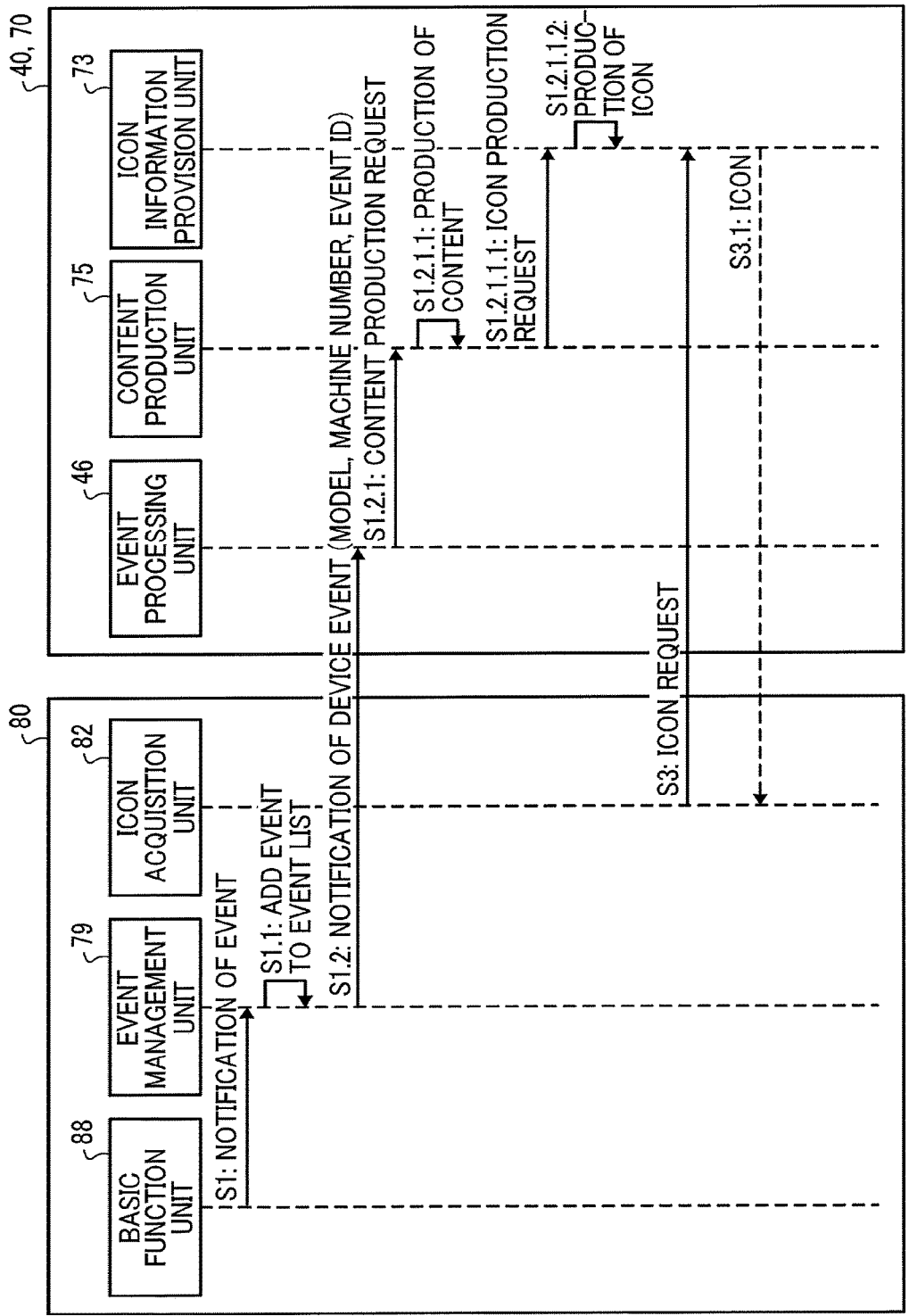
FIG. 8 is a diagram illustrating an example of sequence of process in the information distribution system.

FIG. 8 is a diagram illustrating an example of sequence of comprehensive actions in the information distribution system 100. FIG. 8 illustrates only major ones of the functional units of the image forming apparatus 80 and the server system.

S1: Upon detection of an event, the basic functional unit 88 of the image forming apparatus 80 notifies the event management unit 79 of the event.

S1.1: The event management unit 79 registers the event in the event list DB 8001.

S1.2: The device information transmission unit 89 transmits the device information related to the event registered by the event management unit 79 to the remote monitoring apparatus 40.

S1.2.1: The device information reception unit 43 of the remote monitoring apparatus 40 receives the device information and the device information management unit 42 determines the necessary process based on the device information. In the case of toner end, the device information management unit 42 determines that the ordering of the consumable and the production of the content are necessary. In the case of a paper jam, the device information management unit 42 determines that the production of the content is necessary. In the case of a paper jam, the device information management unit 42 determines whether a customer engineer is to be dispatched. If necessary, the customer engineer is dispatched.

The event processing unit 46 transmits the model, machine number, and event ID of the image forming apparatus 80 together with a content production request to the information distribution apparatus 70.

S1.2.1.1: The content production unit 75 produces the content according to the event. In addition, the content according to the event may be produced based on the subscription information and the display authorization. The content production unit 75 stores the produced content in association with the model, machine number, and event ID in the HDD 307. The content is distributed in response to a request from the image forming apparatus 80.

S1.2.1.1.1: The content production unit 75 sends to the icon information provision unit 73 an icon production request according to the content. Accordingly, notification of the content ID indicating the type of the content is provided.

S1.2.1.1.2: The icon information provision unit 73 produces the information display icon 90 corresponding to the content. Therefore, the information display icon 90 is produced corresponding to both the event and the content.

S3: The icon acquisition unit 82 sends to the image forming apparatus 80 the information display icon 90 together with the model and the machine number. The acquisition of the information display icon 90 will be described later with reference to FIG. 11. All the information display icons 90 corresponding to the events having occurred in the image forming apparatus 80 may be acquired regardless of the types of the events. This is because the information display icons 90 for the eliminated events would be deleted.

S3.1: The icon information provision unit 73 transmits to the image forming apparatus 80 the information display icons 90 associated with the model and machine number of the image forming apparatus 80.

In this way, the image forming apparatus 80 stores the information display icons 90 corresponding to the events.

<Communications Between the Operation Unit 20 and the Main Unit 10>

Figure 9:
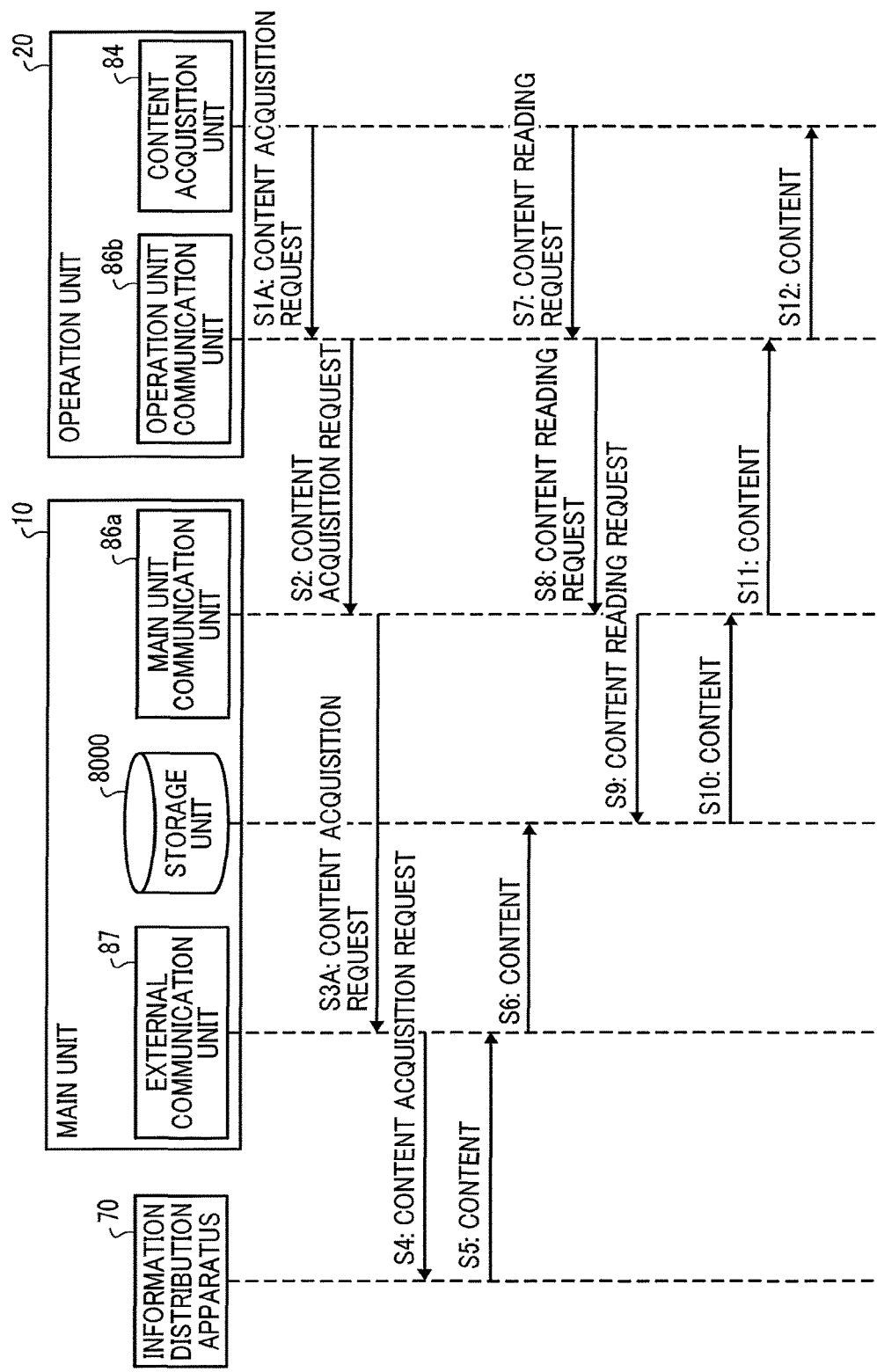
FIG. 9 is a diagram illustrating an example of sequence of process for an operation unit to acquire contents via a main unit.

The procedure for communications between the operation unit 20 and the main unit 10 will be described with reference to FIG. 9. As described above, the operation unit 20 and the main unit 10 communicate with each other via the dedicated communication path 30, and the operation unit 20 requests for external communications to the main unit 10. FIG. 9 is a diagram illustrating an example of sequence of process for the operation unit 20 to acquire contents via the main unit 10.

S1A: The content acquisition unit 84 sends a content acquisition request to the operation unit communication unit 86b.

S2: The operation unit communication unit 86b transmits the content acquisition request to the main unit communication unit 86a.

S3A: The main unit communication unit 86a sends the content acquisition request to the external communication unit 87.

S4: The external communication unit 87 transmits the content acquisition request to the information distribution apparatus 70.

S5: The information distribution apparatus 70 transmits the content to the external communication unit 87.

S6: The external communication unit 87 stores the content in the storage unit 8000. Accordingly, when the storage device of the operation unit 20 has a small capacity, the storage device of the main unit 10 can be used. The external communication unit 87 determines whether there is the HDD 14 as a storage device. Only when there is the HDD 14, the external communication unit 87 holds the content. The HDD 14 has a large capacity and thus the external communication unit 87 can hold the content only when the HDD 14 has sufficient storage space.

S7: After sending the content acquisition request, the content acquisition unit 84 monitors whether the content is stored in the storage unit 8000. The operation unit 20 has acquired the information on whether the main unit 10 has the storage unit (HDD) at the time of activation, and therefore makes an inquiry of the main unit 10 only when the main unit 10 has the storage unit 8000. When the main unit 10 does not have the HDD 14, the operation unit 20 reads the content from the RAM 23 of the operation unit 20.

S8: The operation unit communication unit 86b transmits a content reading request to the main unit communication unit 86a.

S9 and S10: The main unit communication unit 86a reads the content from the storage unit 8000.

S11: The main unit communication unit 86a transmits the content to the operation unit communication unit 86b.

S12: The operation unit communication unit 86b sends the content to the content acquisition unit 84.

At step S1A, the content acquisition unit 84 sends the content acquisition request. Specifically, the content acquisition unit 84 first reads the content from the storage unit 8000, compares the content production time to the current time, and then transmits the content acquisition request to the main unit 10 only when a predetermined period of time has elapsed. This reduces the communication load and processing load on the information distribution apparatus 70. That is, when a predetermined period of time has not elapsed, steps S7 to S12 are carried out.

The sequence of acquiring the information display icon 90 is the same as described above. With the HDD, the content is stored in the operation unit if it is not stored in the main unit. However, the icons and contents for the initial screen are stored in the operation unit regardless of the presence or absence of the HDD.

<Procedure for Producing the Information Display Icon>

Figure 10:
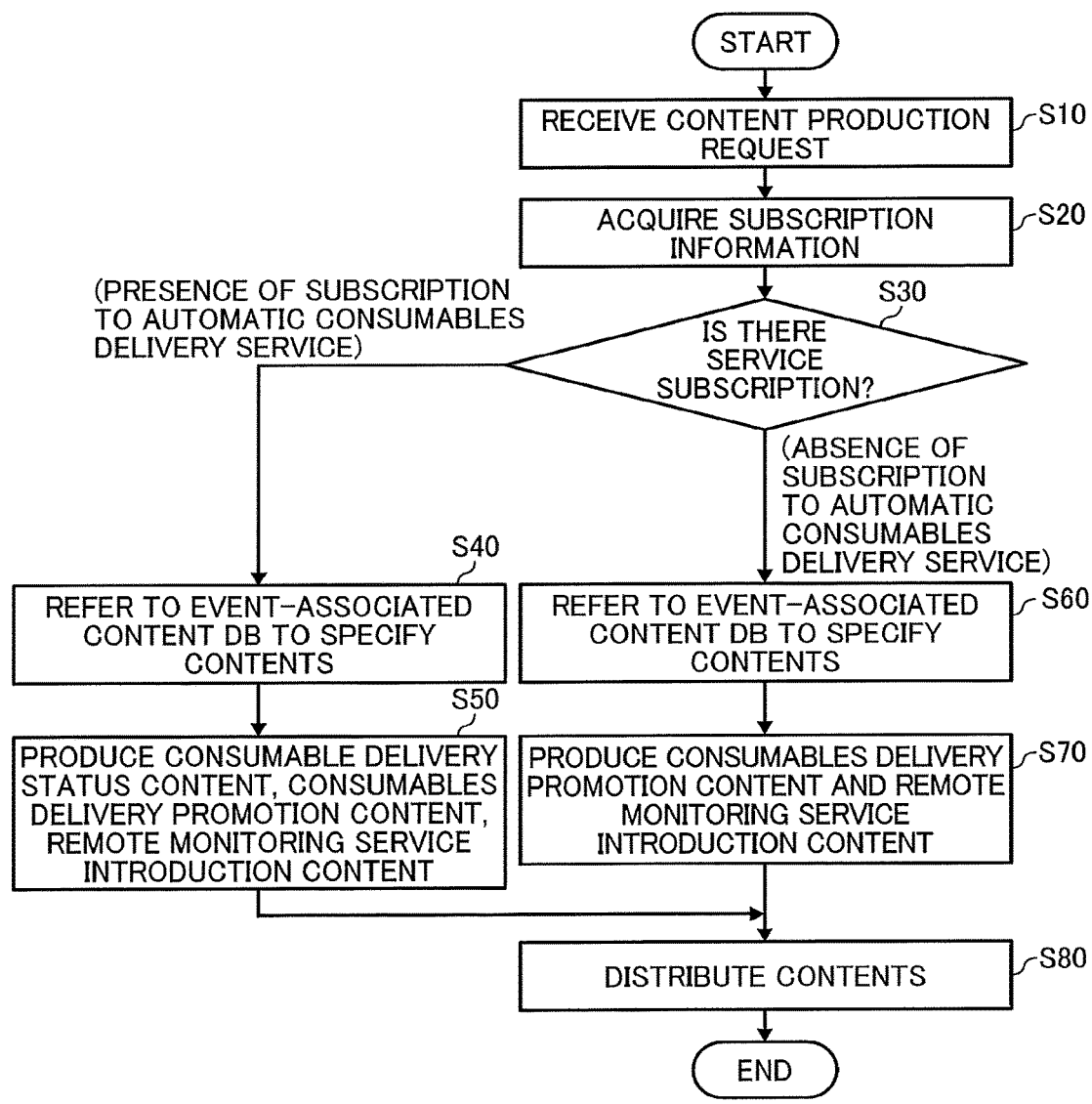
FIG. 10 is a flowchart of an example of process for a content production unit to produce contents.

FIG. 10 is a flowchart of an example of process for the content production unit 75 to produce contents. The process described in FIG. 10 is executed at step S1.2.1.1 described in FIG. 8. The contents for the toner end event will be described here as an example.

First, the content production unit 75 receives a content production request with the event ID, model, and machine number from the remote monitoring apparatus 40 (S10).

Next, the content production unit 75 acquires the state of subscription to the automatic consumables delivery service for the image forming apparatus 80 specified by the model and the machine number from the subscription information (S20). The content production unit 75 then determines whether the automatic consumables delivery service is subscribed for the image forming apparatus 80 (S30).

When the automatic consumables delivery service is subscribed, the content production unit 75 refers to the event-associated content DB 7001 to specify the contents IDs (C001, C002, and C003) associated with the event ID (S40).

Figure 13A:
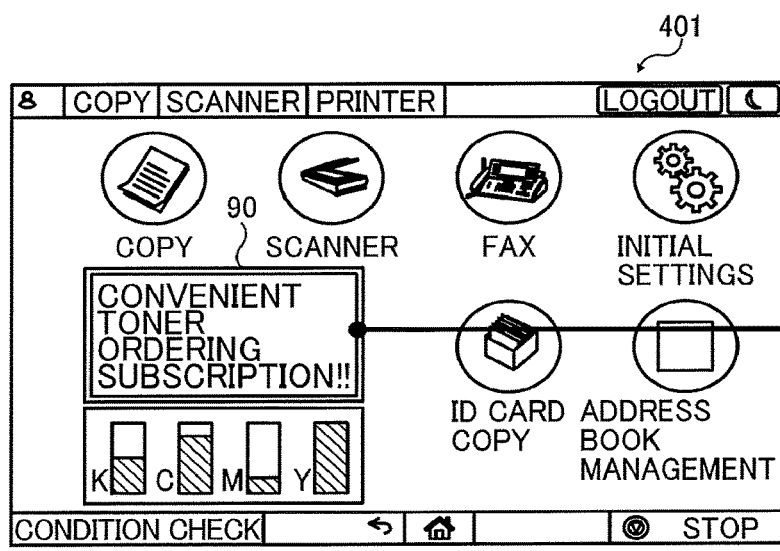
FIGS. 13A and 13B (FIG. 13) are diagrams illustrating an example of consumables delivery promotion content as a content for general users and administrator.
Figure 13B:
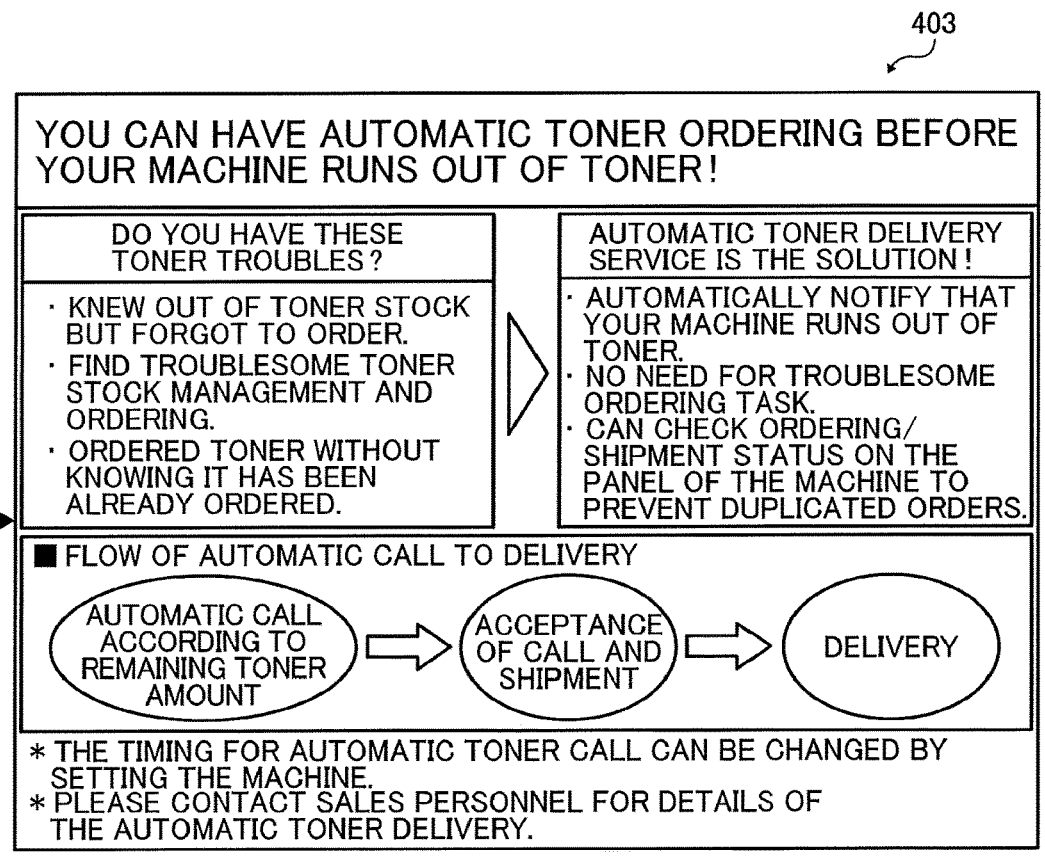
Figure 15:
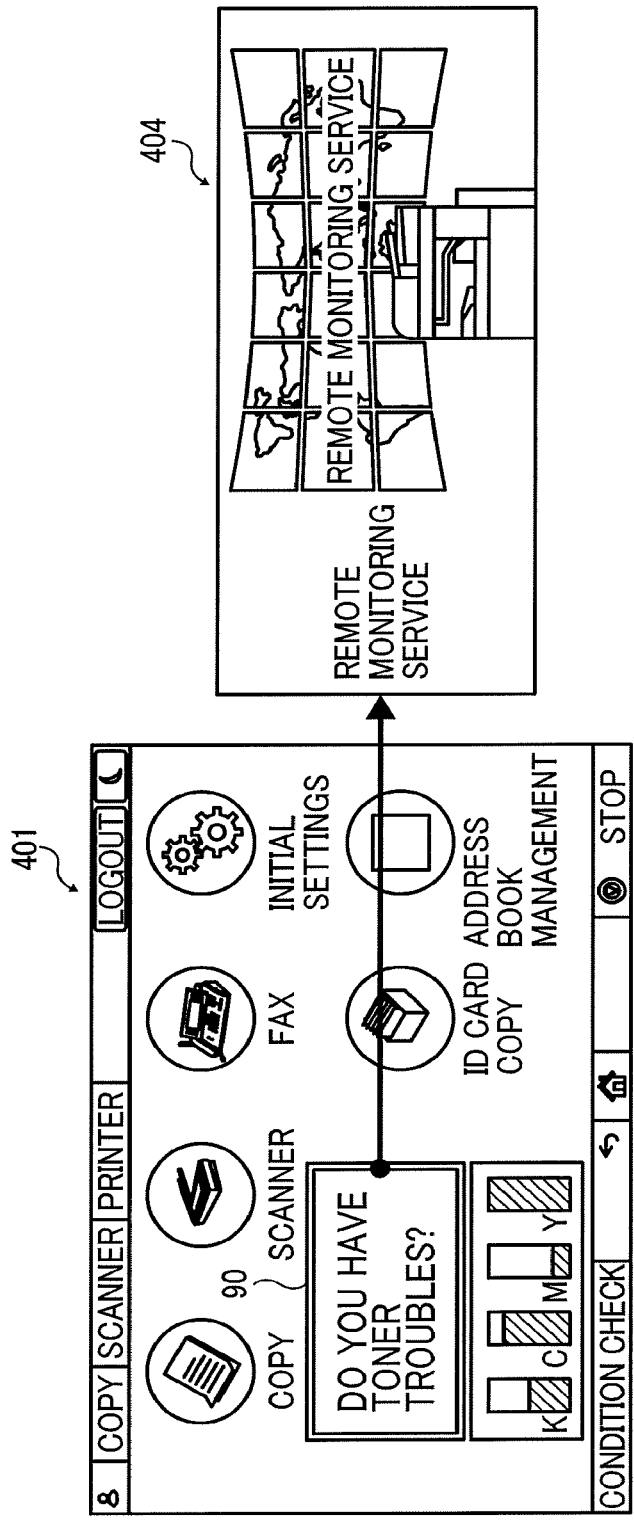
FIG. 15 is a diagram illustrating an example of remote monitoring service introduction content as a content for administrator, general users, and guests.

Therefore, the content production unit 75 produces a consumables delivery status content 402 illustrated in FIG. 12, a consumables delivery promotion content 403 illustrated in FIG. 13, and a remote monitoring service introduction content 404 illustrated in FIG. 15 (S50). The consumables delivery status content 402 is for administrator, the consumables delivery promotion content 403 is for administrator and general users, and the remote monitoring service introduction content 404 is for administrator, general users, and guests.

Since the customer of the image forming apparatus 80 subscribes to the automatic consumables delivery service, the information distribution apparatus 70 can provide the consumables delivery status to the user 9. In addition, the information distribution apparatus 70 can also provide the content to general users and guests.

When the automatic consumables delivery service is not subscribed, the content production unit 75 refers to the event-associated content DB 7001 to specify the content IDs (C002 and C003) associated with the event ID (S60).

Therefore, the content production unit 75 produces the consumables delivery promotion content 403 illustrated in FIG. 13 and the remote monitoring service introduction content 404 illustrated in FIG. 15 (S70).

In this case, since the customer of the image forming apparatus 80 only subscribes to the remote monitoring service, the automatic consumables delivery service can be introduced to promote the utilization of the automatic delivery service.

After producing the contents, the content distribution unit 76 distributes the contents to the image forming apparatus 80 (S80).

In this way, the contents associated with the event can be produced taking the user authorization information into account. In addition, the contents can be produced taking the subscription status into account.

All the contents are described in HTML, script language, CSS, or the like. The content may be called web page or web application. The content may be a still image or moving image.

In the case of the paper jam event, the contents do not change depending on the subscription to the automatic consumables delivery service. Accordingly, the content production unit 75 produces a paper jam content 405 (content C004) illustrated in FIG. 14 as a content for administrator, general users, and guests.

<Display of the Information Display Icon and the Content on the Image Forming Apparatus 80>

Figure 11:
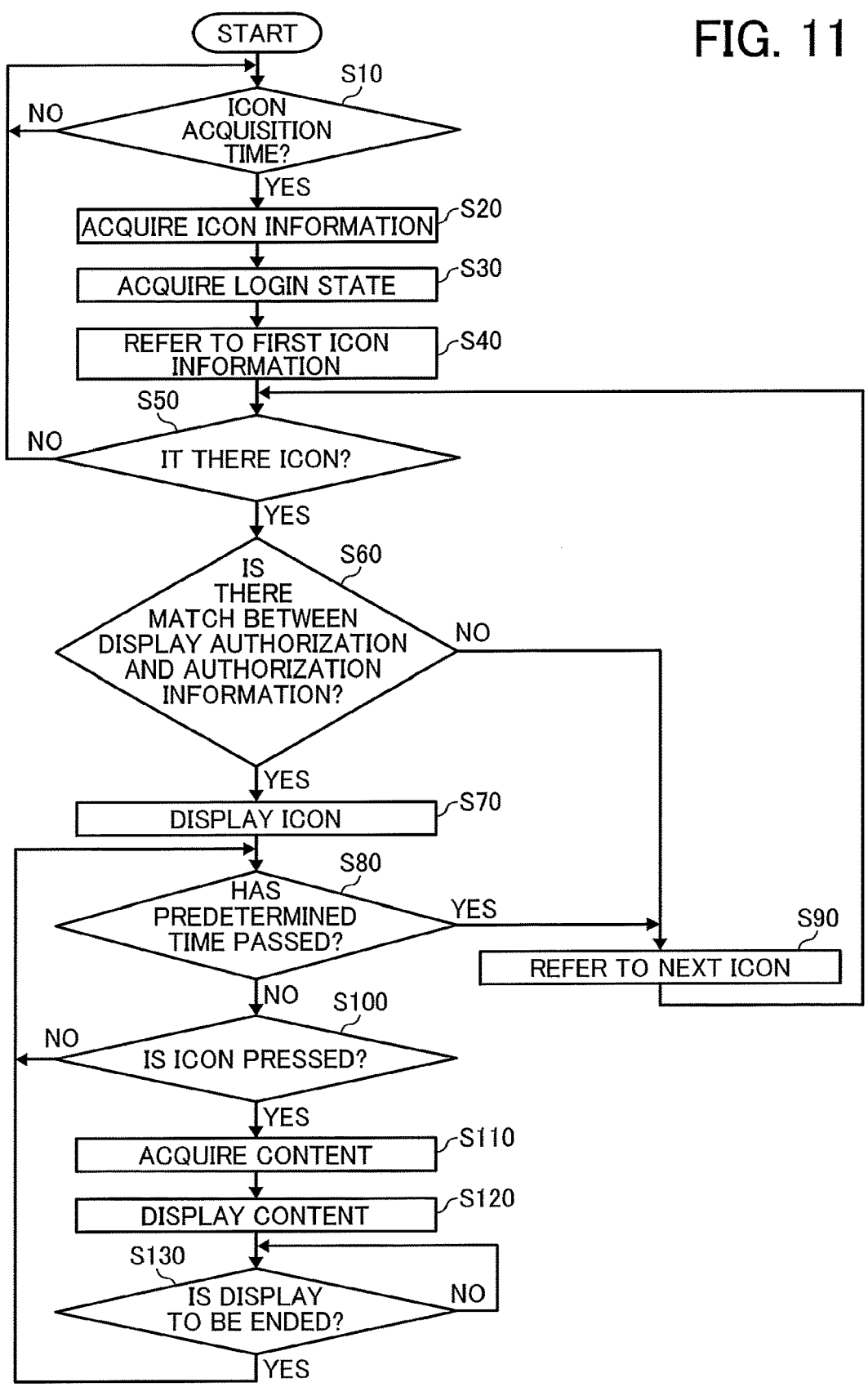
FIG. 11 is a flowchart of an example of process for the image forming apparatus to display an information display icon and a content.

FIG. 11 is a flowchart of an example of process for the image forming apparatus 80 to display the information display icon 90 and the content. The process described in FIG. 11 is repeatedly executed while the image forming apparatus 80 is powered on, for example.

The icon acquisition unit 82 acquires the information display icon 90 from the information distribution apparatus 70 at a predetermined timing. Accordingly, the icon acquisition unit 82 determines whether the timing for acquiring the information display icon 90 has come (S10). For example, the acquiring timing is as follows:

The information display icon 90 is not yet acquired

Once per hour with a press by the user 9

After acquisition of the information display icon 90

Once per day

When the result of the determination at step S10 is yes, the icon acquisition unit 82 acquires the information display icon 90 from the information distribution apparatus 70 (S20). The acquired information display icon 90 is stored in the icon DB 8002.

Next, the icon display unit 83 acquires log-in state (S30). The log-in state is information on the user 9 having performed a login. In the embodiment, the authorization information on the user 9 is acquired in the log-in state. The icon acquisition unit 82 acquires the authorization information on the user 9 with reference to the user DB based on the identification information on the user 9 having logged-in to the image forming apparatus 80.

The user 9 logs in to the image forming apparatus 80 before step S10 or during steps S10 to S30. At the time of the log-in, the user 9 enters the user ID and the user name, and the authentication unit 78 of the image forming apparatus 80 refers to the user DB to authenticate the user 9.

Next, the icon display unit 83 reads the information display icons 90 sequentially one by one from the icon DB 8002 (S40). When there is a plurality of information display icons 90, the icon display unit 83 (widget application) reads the information display icons 90 sequentially one by one from the storage unit (the icon DB 8002) at predetermined time intervals, and displays the same.

The image forming apparatus 80 may not store the information display icons 90 immediately after the activation of the image forming apparatus 80. Accordingly, the icon display unit 83 determines whether the information display icons 90 are registered in the icon DB 8002 (S50).

When the result of the determination at step S50 is no, there is no information display icon 90 to be displayed, and the process returns to step S10.

When the result of the determination at step S50 is yes, the icon display unit 83 determines whether the authorization information on the user acquired as the log-in state meets the display authorization in the information display icon 90 (S60).

When the result of the determination at step S60 is no, the information display icon 90 is not to be displayed. Accordingly, the icon display unit 83 acquires the next information display icon 90 from the icon DB 8002 (S90). Alternatively, when the result of the determination at step S60 is no, the icon display unit 83 may display only the information display icons 90 with the display authorizations meeting the authorization information. This makes it possible to select the information display icons 90 that can be displayed to the logging-in user.

When the result of the determination at step S60 is yes, the icon display unit 83 displays the information display icon 90 on the control panel 27 (S70).

At a predetermined timing, the icon display unit 83 refers to the next information display icon 90 (S90). The predetermined timing is a timing when a predetermined period of time has elapsed, for example. The predetermined period of time is about several seconds to several minutes, for example. Alternatively, the icon display unit 83 may refer to the next information display icon 90 at a fixed time, at each detection of an event, or upon reception of the information display icon 90.

Until the lapse of the predetermined period of time (S80: No), the operation acceptance unit 81 determines whether the information display icon 90 is pressed (S100).

When the information display icon 90 is pressed (S100: Yes), the content acquisition unit 84 acquires the content based on the URL in the information display icon 90 (S110).

The content display unit 85 displays the contents on the control panel 27 (S120).

During the display of the contents, the control panel 27 returns to the home screen 401 with a press of the home button. During the display of the contents, the operation acceptance unit 81 determines whether the home button is pressed (S130). Accordingly, the previous information display icon 90 is displayed on the control panel 27, and then the process returns to step S80.

In this way, the image forming apparatus 80 can acquire the information display icons 90 corresponding to events from the information distribution apparatus 70 and display the same while switching on a regular basis. In addition, the user 9 can press the information display icon 90 to access the URL in the pressed information display icon 90 and display the contents. At that time, only the contents meeting the authorization information on the user 9 can be displayed.

<Example of Contents>

FIG. 12 is a diagram illustrating an example of consumables delivery status content 402 as an example of content for administrator.

First, the information display icon 90 has the content name "toner delivery status check" on the home screen 401. The information display icon 90 indicates the toner delivery status and is produced corresponding to the toner end event.

From the indication "toner delivery status check," the user determines that there has occurred a toner-related event, and expects that the toner delivery status will be displayed. Thus, the information display icon 90 can guide the user to the display of the content.

The consumables delivery status content 402 has a respective toner delivery history 501 and a delivery history list 502. The respective toner delivery history 501 is the latest delivery history of toner of each color. As illustrated in FIG. 12, the delivery histories of the black, cyan, magenta, and yellow toners are displayed. This allows the user 9 to check readily when the toner of each color has been delivered.

The delivery history list 502 is a field in which the past delivery histories are displayed in time series. This allows the user 9 to check the past delivery histories of the frequently used black toner, for example.

The respective toner delivery history 501 is produced as described below. The content production unit 75 specifies the record of the model and machine number of the image forming apparatus 80 having requested for a content, from the consumables delivery status. Then, the content production unit 75 searches the delivery histories by toner color in order of order dates, from latest to earliest, and specifies the latest delivery histories by toner color. The toner colors can be distinguished from one another by product code or product name.

The delivery history list 502 is produced as described below. The content production unit 75 specifies the record of the model and machine number of the image forming apparatus 80 having requested for a content, from the consumables delivery status. Then, the content production unit 75 acquires the delivery histories for the past one year in time series, for example.

Each of the toner delivery history 501 and the delivery history list 502 has the fields of automatic call date 503, product name 504, and delivery status 505. The automatic call date 503 indicates the order date described in Table 6. The product name indicates the name of consumables described in Table 6. The delivery status indicates the delivery status described in Table 6. The content production unit 75 reads these fields from Table 6 to produce contents.

The user 9 can view the consumables delivery status content 402 to know the current delivery status of the consumables and feel at ease in waiting for the delivery, and prevent duplicated orders. In addition, the manufacturer of the image forming apparatus 80 can reduce costs for customer service because inquiries from customers will decrease.

FIG. 13 is a diagram illustrating an example of consumables delivery promotion content 403 as a content for general users and administrator.

The information display icon 90 has the content name "convenient toner ordering subscription" on the home screen 401. The information display icon 90 is intended to display advertisements related to the automatic toner delivery service, and is produced for the toner end event.

From the indication "convenient toner ordering subscription," the user determines that there has occurred a toner-related event, and considers a subscription to convenient toner ordering. Thus, the information display icon 90 can guide the user to the display of the content.

The consumables delivery promotion content 403 is an advertisement for automatic consumables delivery service. Inconveniences resulting from not subscribing to the automatic consumables delivery service are displayed (forgetting to make an order and duplicated ordering). In addition, the flow of the automatic consumables delivery is displayed.

The user 9 can view the consumables delivery promotion content 403 and know the presence of the automatic consumables delivery service. In addition, the manufacturer of the image forming apparatus 80 can reduce costs for customer service because the occasions for processing orders from customers will decrease.

Figure 14:
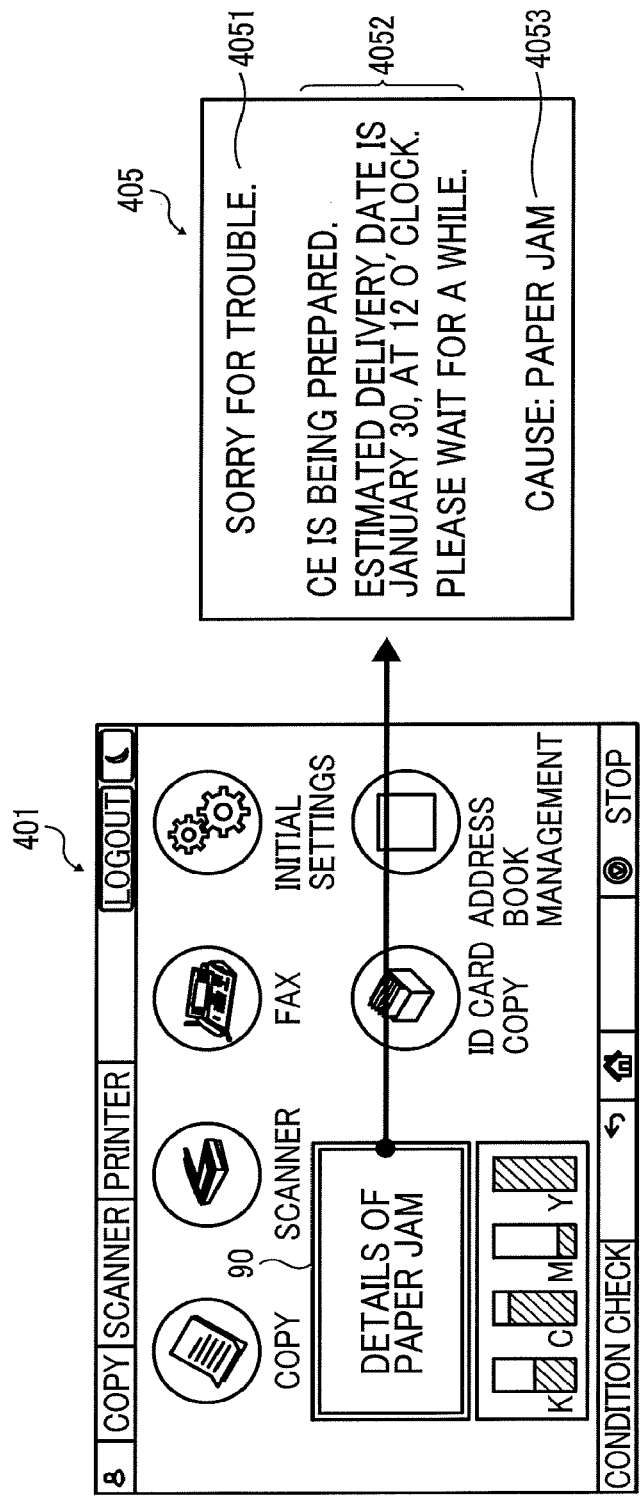
FIG. 14 is a diagram illustrating an example of paper jam content as a content for administrator, general users, and guests.

FIG. 14 is a diagram illustrating an example of paper jam content 405 as a content for administrator, general users, and guests.

The information display icon 90 has the content name "paper jam has occurred" on the home screen 401. The information display icon 90 is produced for the paper jam event.

From the indication "paper jam has occurred," the user determines that a paper jam-related event has occurred and wishes to know the status of the paper jam. Thus, the information display icon 90 can guide the user to the display of the content.

The paper jam content 405 includes an apology message for paper jam 4051, a handling status 4052, and details of trouble 4053. The user 9 can check the handling status 4052 to ascertain when a customer engineer will come or whether there is no need to contact with a customer engineer. In addition, the user 9 can ascertain the cause why the image forming apparatus 80 cannot be used from the details of trouble 4053.

The manufacturer of the image forming apparatus 80 can reduce costs for customer service because there is no need for the customer engineer to respond to customers.

The apology message for paper jam 4051 and the details of trouble 4053 in the paper jam content 405 are formed in fixed phrases. The handling status 4052 is produced taking the location of the customer engineer and the location of the customer into account. The content production unit 75 acquires the location of the customer engineer from the remote monitoring apparatus 40, and calculates the estimated arrival time based on the distance to the customer registered in a customer DB or the like.

FIG. 15 is a diagram illustrating an example of remote monitoring service introduction content 404 as a content for administrator, general users, and guests.

The information display icon 90 has the content name "Do you have any toner troubles?" on the home screen 401. The information display icon 90 is produced for the toner end event.

From the indication "Do you have any toner troubles?" the user determines that a toner-related event has occurred and the situation will be able to improve. Thus, the information display icon 90 can guide the user to the display of the content.

The remote monitoring service introduction content 404 includes a web page for introduction to the remote monitoring service. The user 9 can acquire the information on the remote monitoring service from the web page.

<Display Example of the Information Display Icon>

Figure 16A:
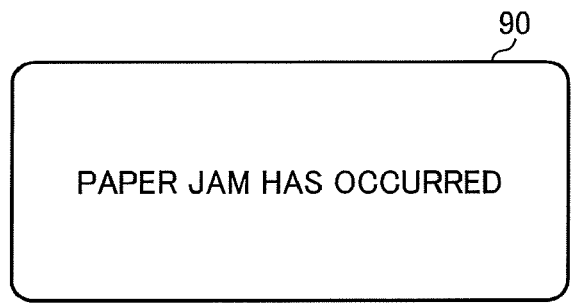
FIGS. 16A, 16B, and 16C (FIG. 16) are diagrams describing display examples of information display icon.

FIG. 16 is a diagram describing display examples of the information display icon 90. The information display icon 90 illustrated in FIG. 16A has the content name "paper jam has occurred" in the center. This message is stationary and the user 9 can easily grasp the details of the information display icon 90.

Figure 16B:
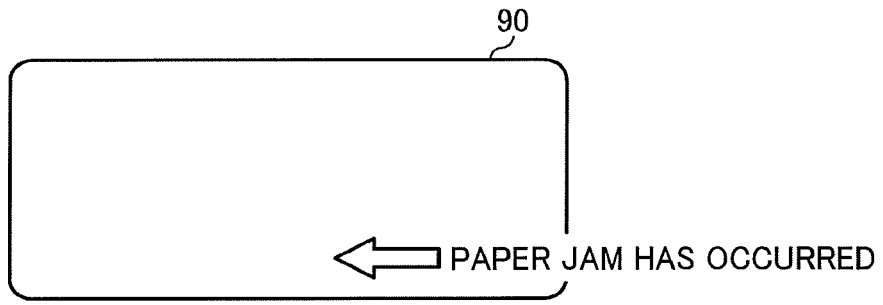

The information display icon 90 illustrated in FIG. 16B has the content name "paper jam has occurred" dynamically displayed in the bottom. The dynamical display means that the content name can be scrolled from right to left (or from left to right, top to bottom, or bottom to top). Moving objects are eye-grabbing and the information display icon 90 can attract the attention of the user 9. In addition, even when the information display icon 90 is small in size, the information display icon 90 can have a long content name.

Figure 16C:
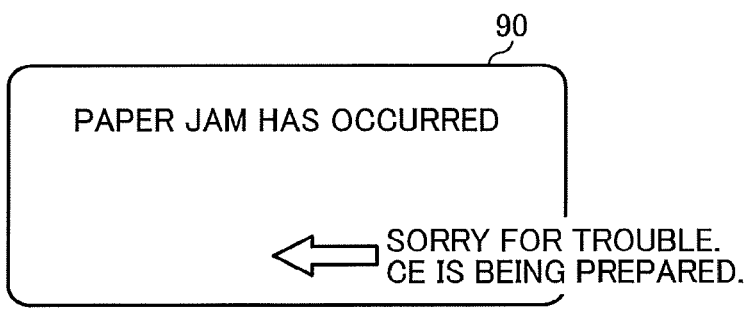

The information display icon 90 illustrated in FIG. 16C has two components illustrated in FIGS. 16A and 16B. This allows the user 9 to easily grasp the details of the information display icon 90 and the information display icon 90 to have a long content name attracting the attention of the user 9. The scrolled text illustrated in FIG. 16C may be the abstract of the content or the sentences of the content, for example.

As described above, the information distribution system according to the embodiment holds the information display icons 90 associated with contents according to events, which allows the user 9 to ascertain what contents will be distributed. The user 9 can display the content with a press of the information display icon 90 and view readily the content (information).

The preferred embodiment for carrying out the present invention has been described so far with the use of examples. However, the present invention is not limited to the examples but can modified or replaced in various manners without deviating from the substance of the present invention.

For example, in the embodiment, toners are taken as an example of consumables. Alternatively, the consumables may be paper, waste toner bottles for collecting toners from the intermediate transfer belt or photoconductors, a fixing belt, or the like. In the case of taking a projector as an electronic device other than the image forming apparatus, the consumables may be a light source lamp.

The information display icon 90 may be simply displayed or read aloud by voice by the image forming apparatus 80.

The screens of the embodiment illustrated in the drawings are mere examples and may be deformed, or have alternative screen elements, additional screen elements, or removed screen elements, as appropriate.

The information display icon 90 may be a mere icon. The information display icon 90 may not necessarily be called icon but may be called button, object, soft key, or the like. The information display icon 90 may be detected by operating a hard key.

In the configuration examples illustrated in FIG. 7 and others, the components are divided according to major functions for ease of understanding of processing performed by the information distribution system 100. The present invention is not limited by the divisions or name of processing units. The processing performed by the information distribution system 100 may be divided to a larger number of processing units according to the contents of the processing. Alternatively, the components may be divided such that one processing unit may include further much processing.

In addition, as illustrated in FIG. 3, the remote monitoring apparatus 40, the consumables ordering apparatus 50, the consumables delivery apparatus 60, and the information distribution apparatus 70 may be implemented by separate information processing devices or two or more of them may be implemented by one information processing device. Alternatively, a larger number of information processing devices than illustrated in FIG. 3 may be implemented.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The invention claimed is:

1. An electronic device communicable with a server system via a network, comprising:
  circuitry configured to
    transmit information on the electronic device to the server system;
    store in a memory information on a display component corresponding to the information on the electronic device that is acquired from the server system;
    read the information on the display component stored in the memory at a predetermined timing;
    display the display component that is read on a display;
    in response to selection of the display component, acquire information associated with the display component from the server system; and
    display the acquired information on the display, wherein
  the information on the electronic device includes an event that has occurred in the electronic device,
  the information on the display component acquired and stored in the memory includes a message guiding to display of information corresponding to the event which indicates whether or not the server system is automatically responding to the event without requiring further user input, and
  the circuitry displays the display component including at least one of the message and the details of the event,
  the information on the display component further includes a uniform resource locator (URL) as address information holding the information corresponding to the event,
  in response to selection of the display component, the circuitry acquires the information corresponding to the event based on the address information, as the information associated with the display component, and displays the acquired information corresponding to the event on the display.

2. The electronic device according to claim 1, wherein when the memory stores information on a plurality of display components, the circuitry reads the information on the plurality of display components sequentially one by one, and displays the read information on the display components one by one while switching between the display components.

3. The electronic device according to claim 1, wherein the circuitry is further configured to obtain authentication information of a user of the electronic device,
  wherein the information on the display component further includes display authorization indicating a user who is allowed to view the information corresponding to the event, and
  when the obtained authentication information of the user satisfies the display authorization, the circuitry acquires the information corresponding to the event for display to the user.

4. The electronic device according to claim 3, wherein when the obtained authentication information of the user does not satisfy the display authorization, the circuitry reads information on the display component, which is different than the information corresponding to the event, from the memory, and displays the display component to the user.

5. The electronic device according to claim 4, wherein, when the event indicates that remaining amount of consumables becomes equal to or less than a threshold,
  the circuitry acquires the information on the display component that includes the address information holding information on delivery status of the consumables and the information on the display component that includes the address information holding information on automatic delivery service of the consumables,
  displays each of the display components while switching between the display components at predetermined time intervals, and
  in response to selection of the display component, acquires the information corresponding to the event based on the address information included in the information on the display component that is displayed with the selection of the display component.

6. The electronic device according to claim 4, wherein, when the event is a failure of the electronic device,
the circuitry acquires the information on the display component that includes the address information holding information on handling status of the failure,
displays the display component, and
in response to selection of the display component, acquires the information corresponding to the event based on the address information included in the information on the display component that is displayed with the selection of the display component.

7. The electronic device according to claim 1, comprising:
a main device having first processing circuitry configured to provide information on state of the main device to the server system, the main device including an image forming device; and
an operation device having second processing circuitry configured to operate the main device, the operation including the display,
the first processing circuitry and the second processing circuitry being configured to operate in cooperation as the circuitry of the electronic device,
wherein the second processing circuitry of the operation device is installed with a second operating system independent of a first operating system of the main device, and a widget application that operates under control of the first operating system to display, as the display component, an icon image produced by the server system based on the information on the state of the main device.

8. The electronic device according to claim 7, wherein the main device further includes the memory configured to store, as the display component, the icon image obtained from the server system,
when the memory stores a plurality of icon images, the widget application reads the icon images sequentially one by one from the memory and displays the read images one by one at a predetermined time interval, and
when one of the icon images is selected, the widget application displays a link destination corresponding to the selected icon image, the icon images respectively corresponding link destinations that are different from one another.

9. An information distribution system comprising:
the electronic device according to claim 1; and
the server system including one or more information distribution apparatuses configured to distribute the information associated with the display component to the electronic device.

10. The electronic device according to claim 1, wherein the information associated with the display component acquired from the server system is generated based on an identification of a type of the event and at least one of a model number and machine number of the electronic device.

11. The electronic device according to claim 1, further comprising:
a main device having first processing circuitry configured to provide an information processing function, the information processing function including a printing function; and
an operation device having second processing circuitry configured to provide an operation user interface,
wherein the first processing circuitry is configured to:
obtain a content from the server system based on a state of the information processing function at the second processing circuitry and device information;
display a widget based on the content;
in response to user operation on the widget, obtain display information based on the URL corresponding to the widget being displayed; and
display the obtained display information.

12. An information processing method comprising:
transmitting information stored on an electronic device to a server system via a network;
storing, in a memory, information on a display component corresponding to the information on the electronic device acquired from the server system;
reading the information on the display component stored in the memory at a predetermined timing;
displaying the display component on a display;
acquiring information associated with the display component from the server system in response to selection of the display component; and
displaying the information acquired by the acquiring step on the display, wherein
the information on the electronic device includes an event that has occurred in the electronic device,
the information on the display component acquired and stored in the memory includes a message guiding to display of information corresponding to the event which indicates whether or not the server system is automatically responding to the event without requiring further user input, and
the displaying includes displaying the display component including at least one of the message and the details of the event,
the information on the display component further includes a uniform resource locator CURL) as address information holding the information corresponding to the event,
in response to selection of the display component, the method includes acquiring the information corresponding to the event based on the address information, as the information associated with the display component, and displays the acquired information corresponding to the event on the display.

13. A non-transitory recording medium which, when executed by one or more processors, cause the processors to perform a method comprising:
transmitting information stored on an electronic device to a server system via a network;
storing, in a memory, information on a display component corresponding to the information on the electronic device acquired from the server system;
reading the information on the display component stored in the memory at a predetermined timing;
displaying the display component on a display;
acquiring information associated with the display component from the server system in response to selection of the display component; and
displaying the information acquired by the acquiring step on the display, wherein
the information on the electronic device includes an event that has occurred in the electronic device,
the information on the display component acquired and stored in the memory includes a message guiding to display of information corresponding to the event which indicates whether or not the server system is automatically responding to the event without requiring further user input, and the displaying includes displaying the display component including at least one of the message and the details of the event, the information on the display component further includes a uniform resource locator (URL) as address information holding the information corresponding to the event, in response to selection of the display component, the method includes acquiring the information corresponding to the event based on the address information, as the information associated with the display component, and displays the acquired information corresponding to the event on the display.

* * * * *